United States Patent [19]
Nabell

[11] Patent Number: 6,122,156
[45] Date of Patent: Sep. 19, 2000

[54] SURGE SUPPRESSION SYSTEM

[75] Inventor: Robert E. Nabell, Ocala, Fla.

[73] Assignee: EDCO, Inc. of Florida, Ocala, Fla.

[21] Appl. No.: 09/153,171

[22] Filed: Sep. 15, 1998

[51] Int. Cl.[7] .................................................... H02H 9/06
[52] U.S. Cl. ...................... 361/119; 361/824; 361/785; 439/92
[58] Field of Search .................... 361/91, 111, 119, 361/127, 736, 785, 784, 823, 824; 379/325, 328, 329, 331, 399, 412; 439/49, 76, 92, 401, 403, 404, 532, 876

[56] References Cited

U.S. PATENT DOCUMENTS

| | | | |
|---|---|---|---|
| 3,798,587 | 3/1974 | Ellis, Jr. et al. | 339/97 P |
| 4,758,920 | 7/1988 | McCartney | 361/119 |
| 4,878,145 | 10/1989 | Lace | 361/118 |
| 4,941,063 | 7/1990 | McCartney et al. | 361/119 |
| 4,964,812 | 10/1990 | Siemon et al. | 439/403 |
| 5,210,937 | 5/1993 | Delamoreaux | 29/839 |
| 5,272,594 | 12/1993 | Delamoreaux | 361/736 |
| 5,312,270 | 5/1994 | Siemon et al. | 439/532 |
| 5,357,568 | 10/1994 | Pelegris | 361/119 |
| 5,359,657 | 10/1994 | Pelegris | 379/412 |
| 5,365,660 | 11/1994 | Capper | |
| 5,410,443 | 4/1995 | Pelegris | 361/119 |
| 5,490,215 | 2/1996 | Pelegris | 379/412 |
| 5,509,066 | 4/1996 | Saligny | |
| 5,555,153 | 9/1996 | Frederiksen | |
| 5,574,614 | 11/1996 | Busse | |
| 5,627,721 | 5/1997 | Figueired | |
| 5,696,820 | 12/1997 | Pelegris et al. | 379/399 |

*Primary Examiner*—Gerald Tolin
*Attorney, Agent, or Firm*—Howrey Simon Arnold & White, LLP

[57] ABSTRACT

A surge suppression system for use in a telephone and data communications terminal block. The surge suppression system includes a modular housing having surge suppression circuitry disposed therein, and a ground rail. The ground rail is mounted on the terminal block. The modular housing includes a plurality of contact blade pairs and associated surge suppression circuitry such that, when positioned on the terminal block, each pair of contact blades disposes surge suppression circuitry between an "equipment side" terminal and a "field side" terminal of the terminal block.

27 Claims, 27 Drawing Sheets

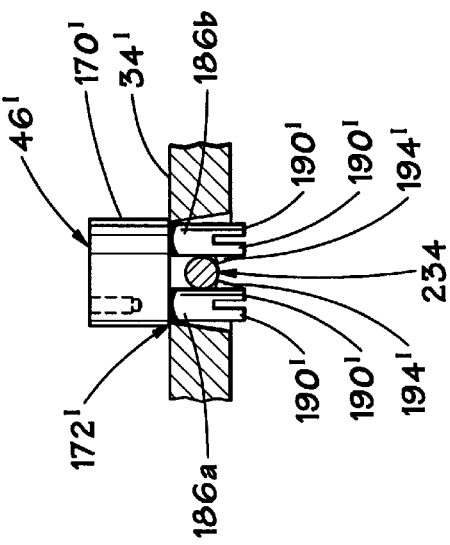
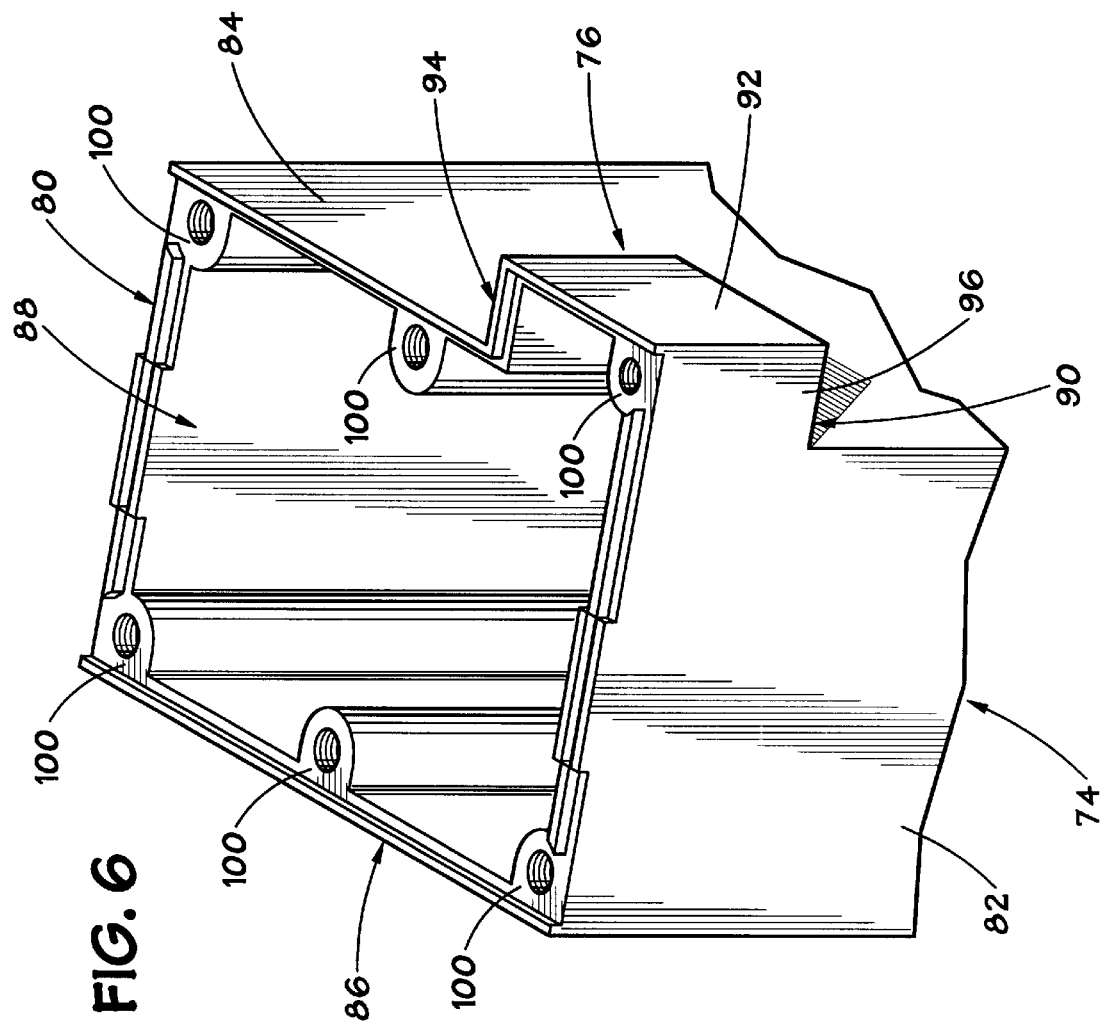

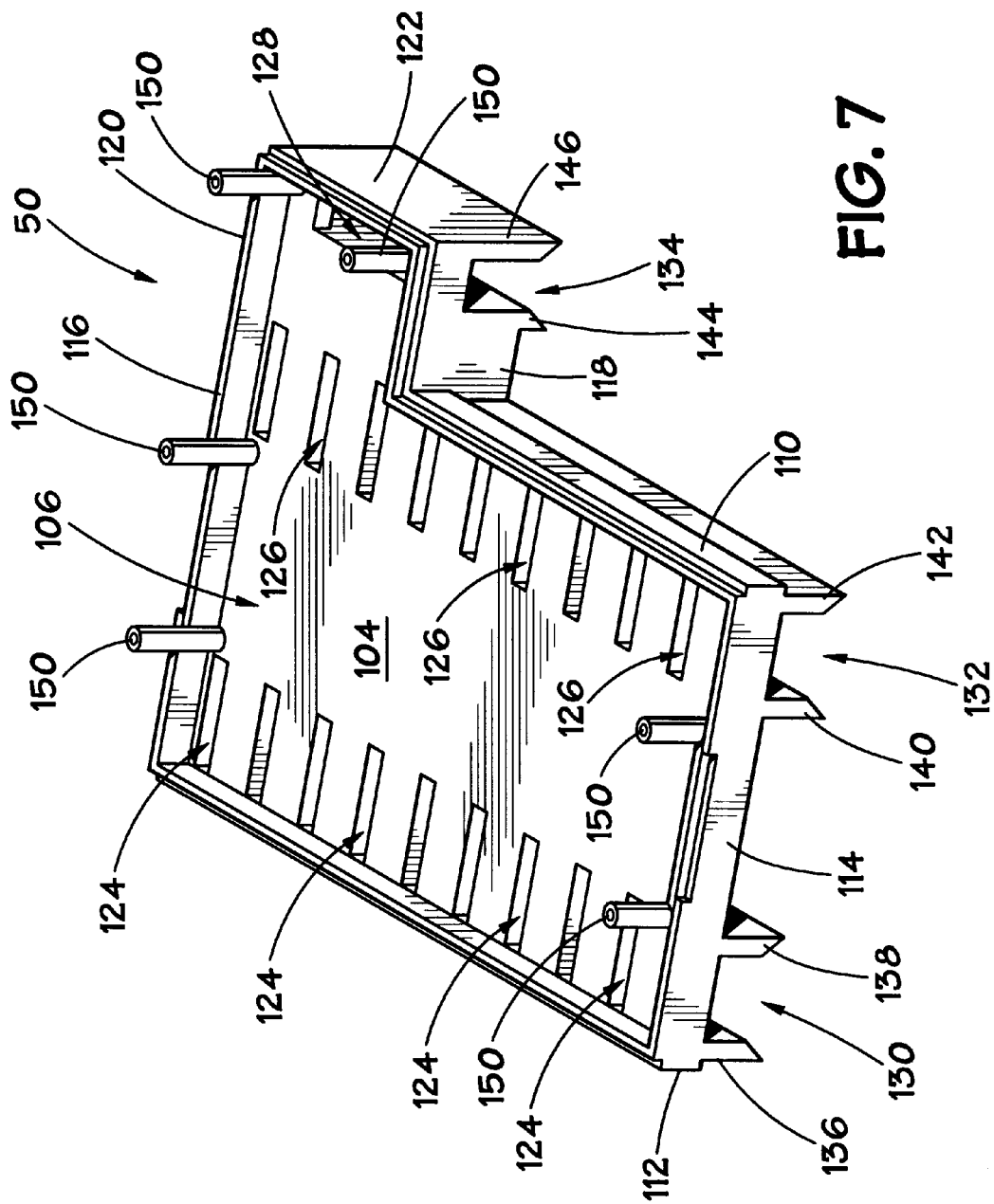

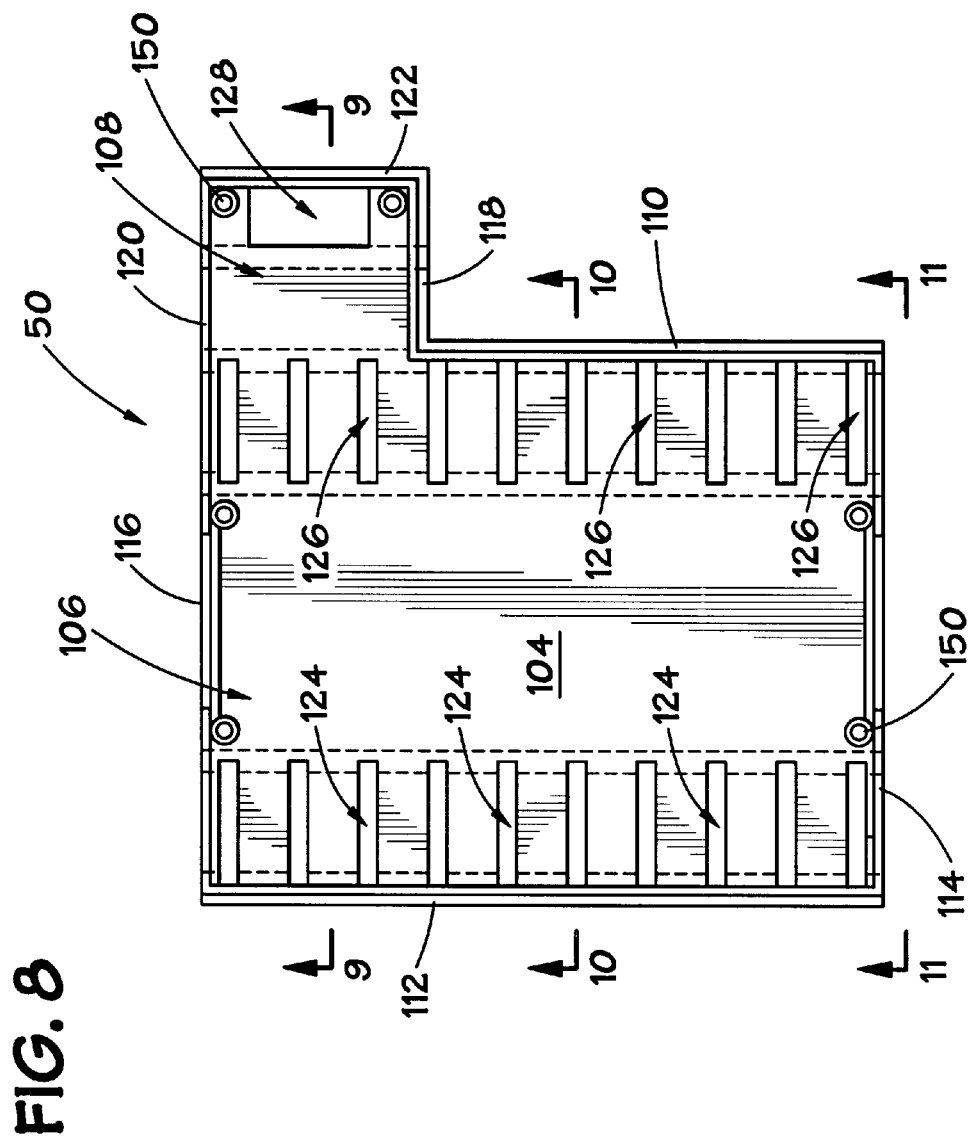

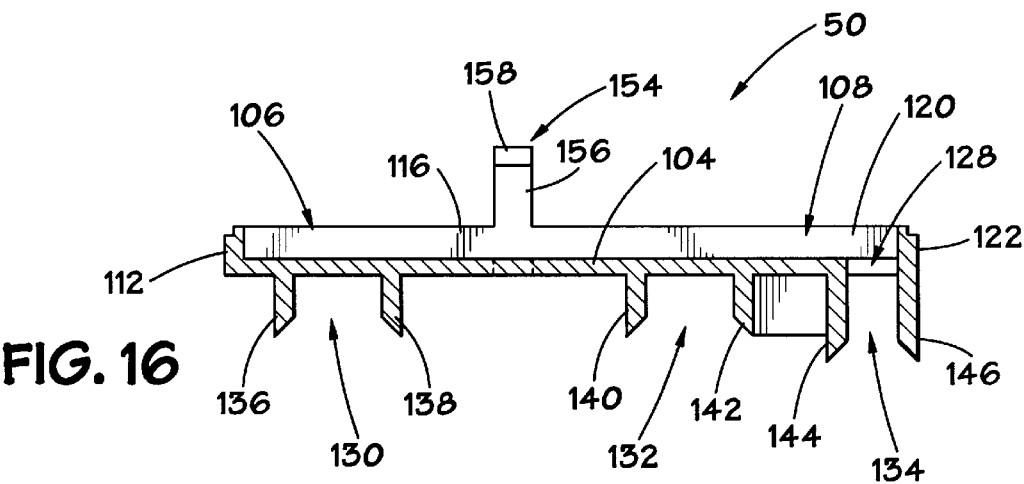
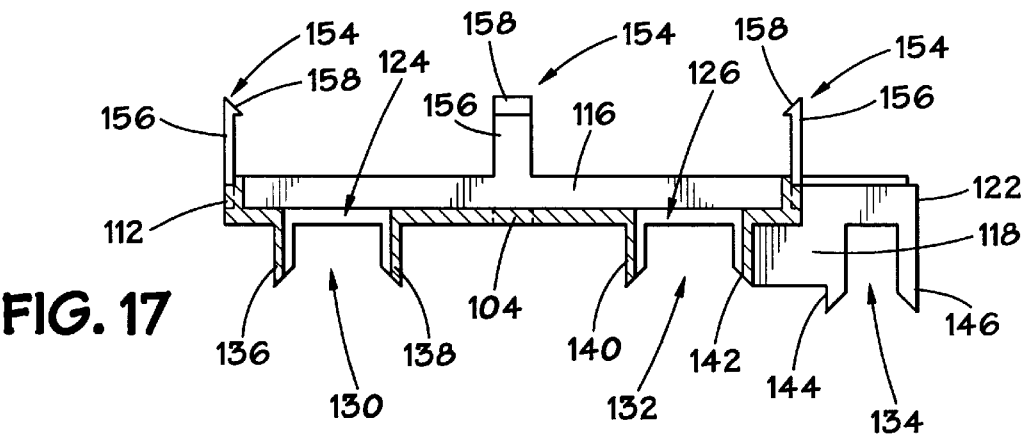
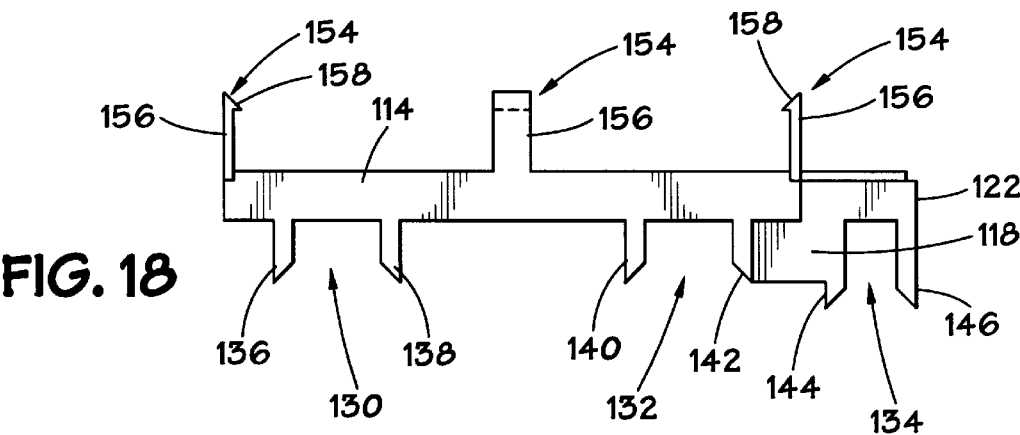

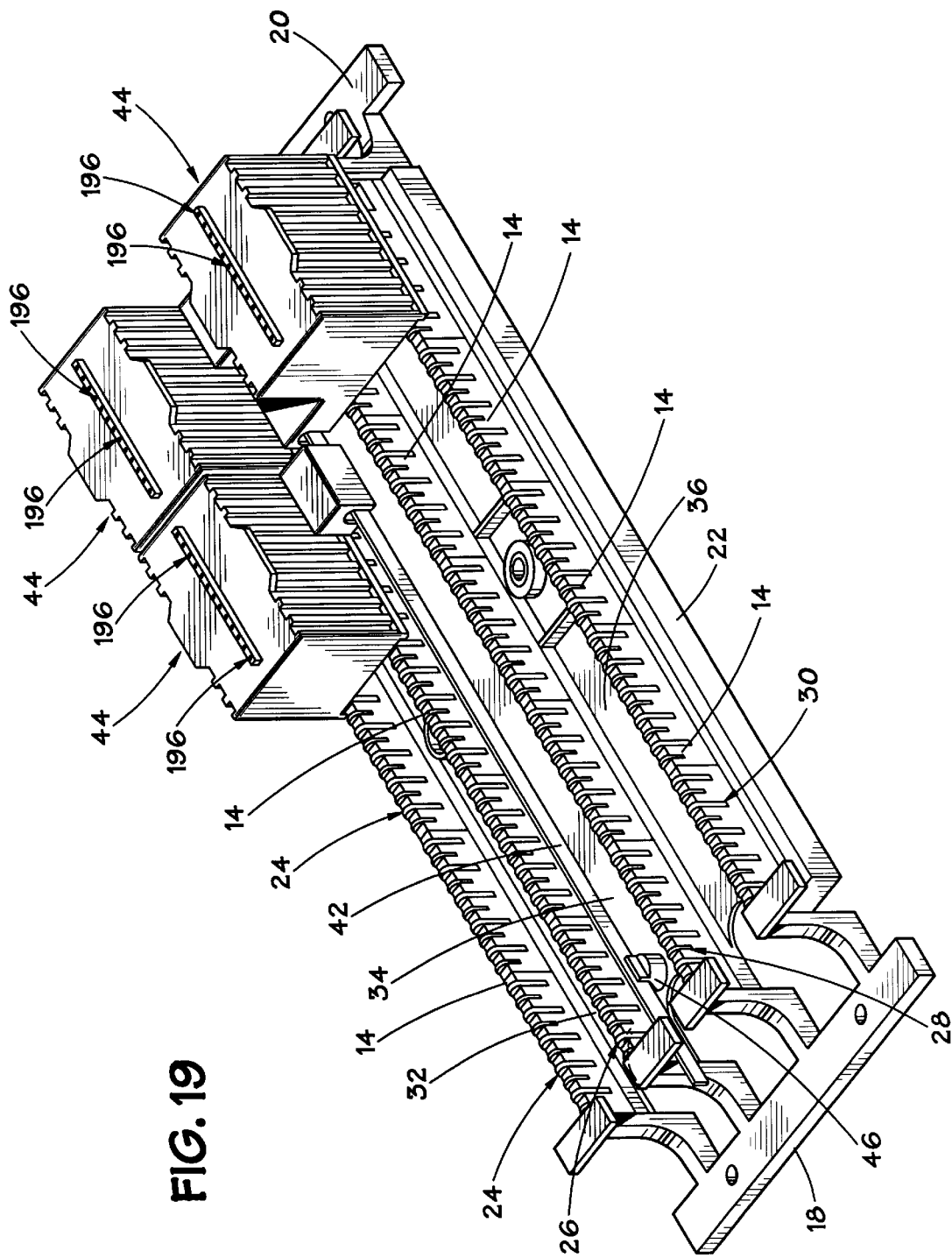

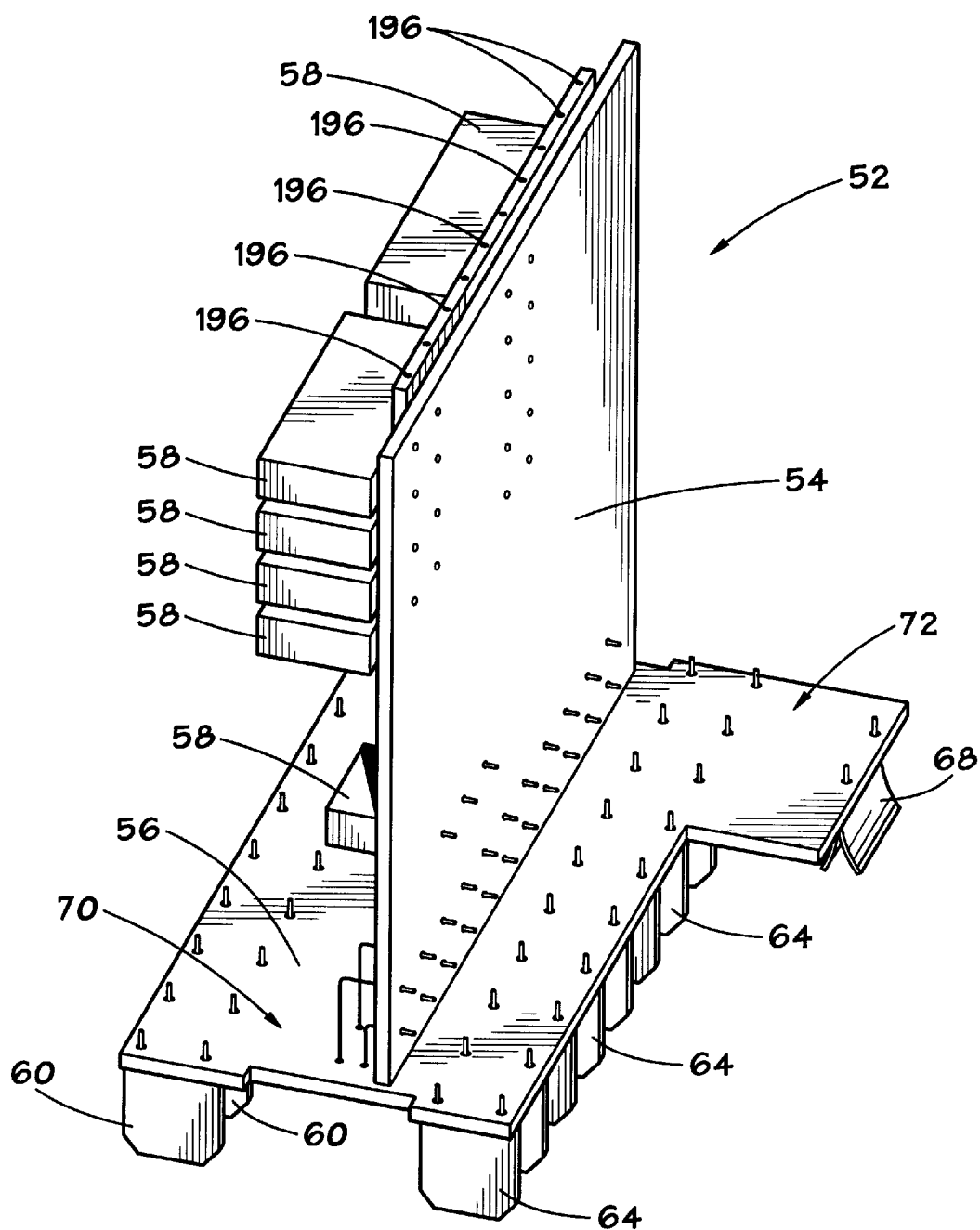

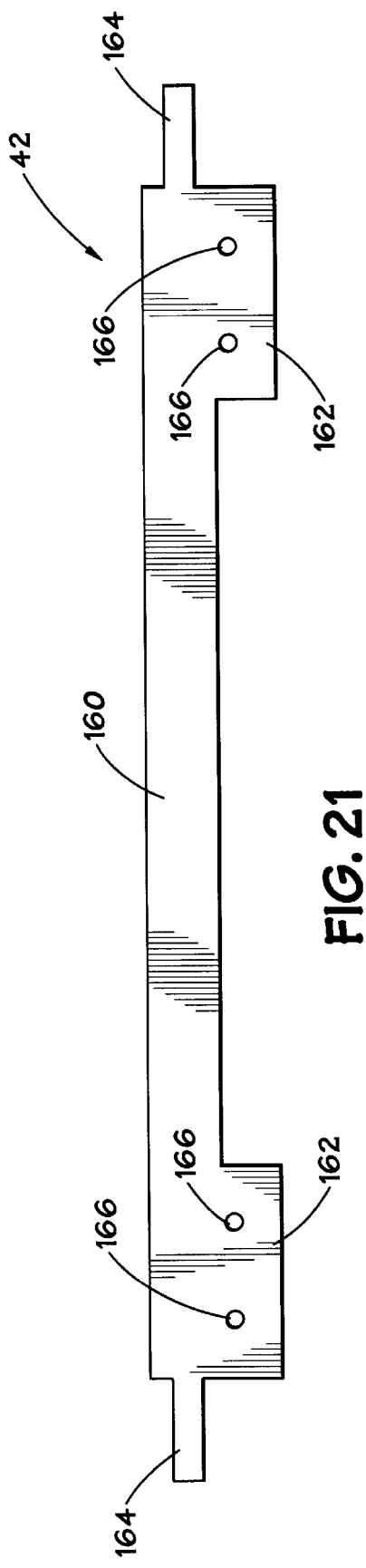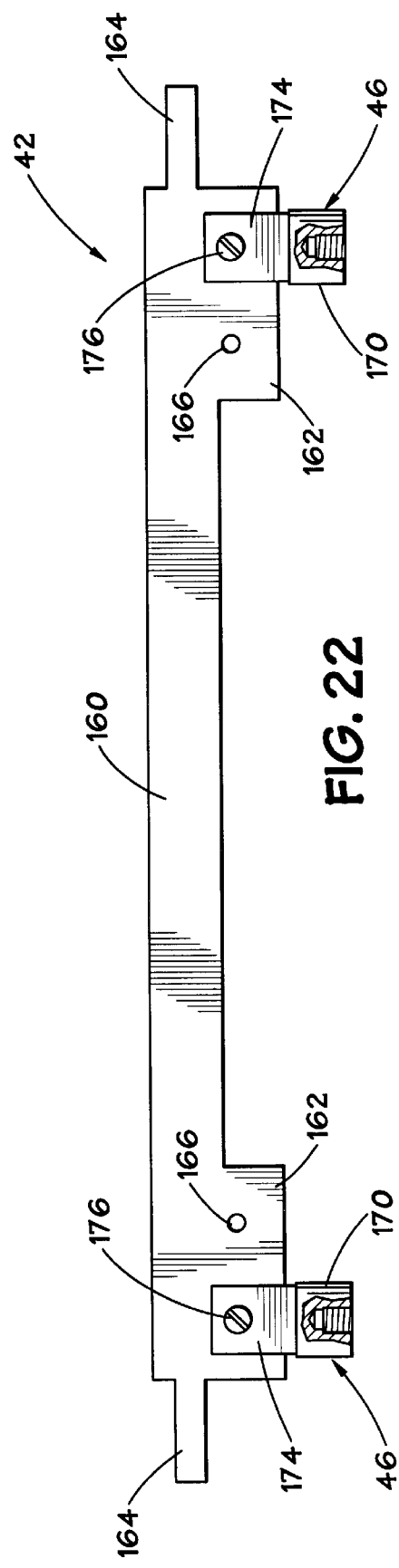

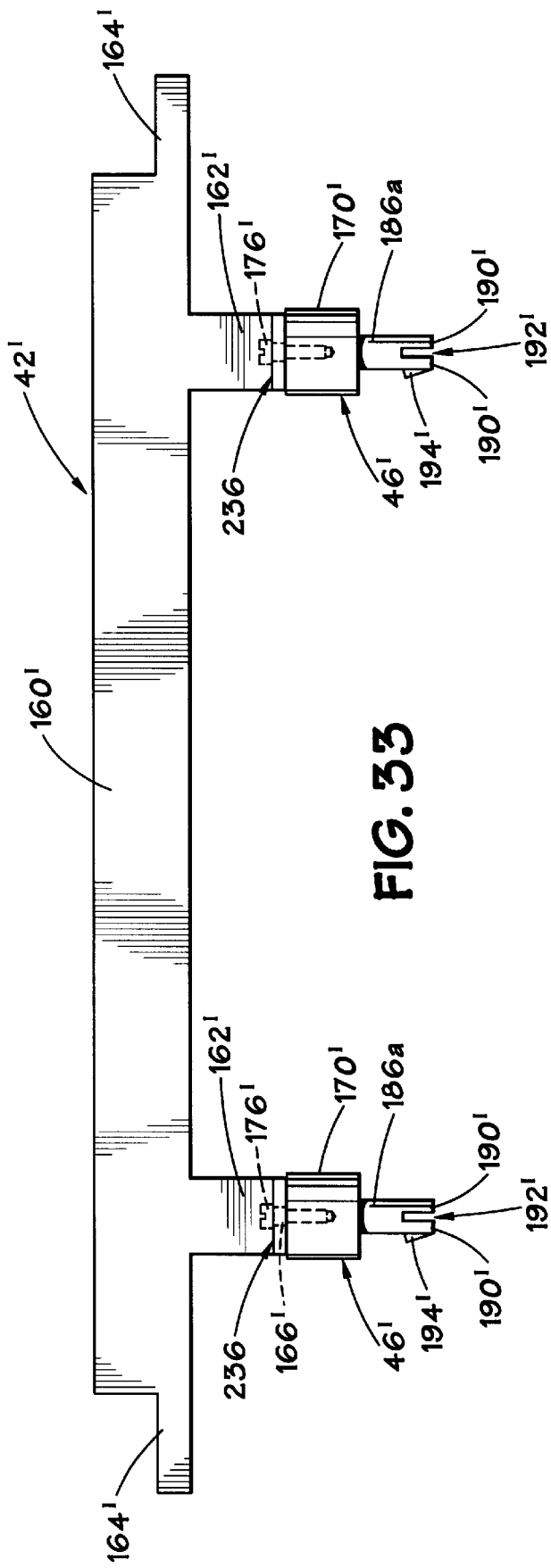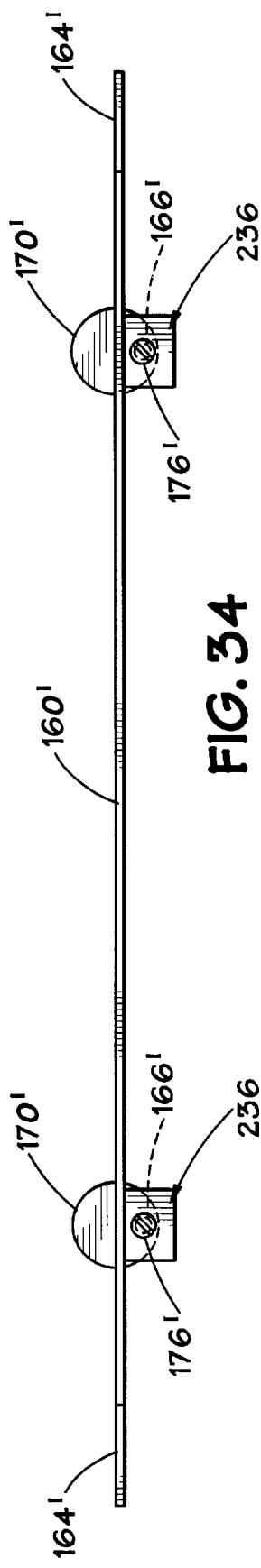

SURGE SUPPRESSION SYSTEM

BACKGROUND OF THE INVENTION

I. Field of the Invention

The present invention relates generally to the field of suppressing unwanted electrical surges within an electrical system. More specifically, the present invention relates to a system for suppressing electrical surges within a field termination block assembly used in the data and telephone communications industry.

II. Discussion of the Prior Art

In the communication industry, and more particularly in the telephone and data transmission industry, field termination block assemblies are commonly used for making electrical cross-connections between two sets of conductors. For example, field termination block assemblies are used in the telephone industry on distribution panels to interconnect conductors in a central office cable to conductors from the various station equipment located within a building. Generally speaking, field termination block assemblies provide the ability to simultaneously make electrical interconnections between a multiplicity of conductors within an electrical system without first removing the insulative covering from the conductors, thereby saving time and money during installation and service operations.

One such field termination block assembly is the well known Type 110 field termination block assembly, commercially available from AT&T Technologies. Examples of Type 110 field termination block assemblies are described in U.S. Pat. No. 3,798,587, U.S. Pat. No. 4,964,812, and U.S. Pat. No. 5,312,270, the teachings of which are collectively incorporated herein by reference. A Type 110 field termination block assembly includes a wiring base and a plurality of connector blocks. The wiring base has a plurality of rows of slotted receptacles for receiving cables therein. The connector blocks include a plurality of blade-like terminal clips capable of mating within the slotted receptacles such that, when the connector blocks are snapped into place on the wiring base, the terminal clips pierce the insulative coating of the cables disposed within the slotted receptacles. The terminal clips are symmetrical and extend from the top to the bottom of the connecting blocks. An input row of slotted receptacles on the wiring block (receiving cables from the "equipment" or "protected" side) may thus be easily interconnected to an output row of slotted receptacles on the wiring block (receiving cables from the "field" or "unprotected" side) by simply extending jumper wires between the various terminal clips along the top edge of adjacent connector blocks.

Communications equipment, and telephone circuitry in particular, operates upon relatively low voltage levels. It is therefore desirable to protect the communications equipment from unusual line characteristics, such as electrical surges resulting in over-voltage or over-current conditions. Various attempts have been made at providing surge protection for the Type 110 field termination block assemblies. However, the techniques employed to date suffer from various drawbacks. Accordingly, a need exists for an improved surge suppression system for Type 110 field termination block assemblies.

SUMMARY OF THE INVENTION

The present invention provides the desired improvement by providing an improved surge suppression system for a Type 110 field termination block assembly.

In one aspect of the present invention, a surge suppression system is provided for electrical interconnection with a field termination block assembly. The field termination block assembly includes a wiring base with at least one input row of slotted receptacles for receiving input cables and at least one output row of slotted receptacles for receiving output cables. The field termination block assembly also includes at least one input connecting block having a plurality of input terminals for electrical connection with the input cables and at least one output connecting block having a plurality of output terminals for electrical connection with the output cables. The surge suppression system comprises a ground rail and a surge suppression module. The ground rail is coupled to the wiring base of the field termination block assembly proximate one of the at least one input row and the at least one output row. The surge suppression module has surge suppression circuitry disposed within a modular housing. The surge suppression circuitry includes a ground coupler for coupling to the ground rail, a plurality of input terminal couplers for coupling to the plurality of input terminals on the input connecting block, a plurality of output terminal couplers for coupling to the plurality of output terminals on the output connecting block, and surge suppression components electrically coupled to the ground coupler and electrically coupled between corresponding pairs of the plurality of input and output terminal couplers for suppressing electrical surges therebetween.

In another aspect of the present invention, an improved field termination block assembly is provided. The improved field termination block assembly includes a wiring base having at least one input row of slotted receptacles for receiving input cables and at least one output row of slotted receptacles for receiving output cables. At least one input connecting block is provided having a plurality of input terminals for electrical connection with the input cables. At least one output connecting block is provided having a plurality of output terminals for electrical connection with the output cables. A ground rail is also provided coupled to the wiring base proximate one of the at least one input row and the at least one output row. A surge suppression module is provided having surge suppression circuitry disposed within a modular housing. The surge suppression circuitry includes a ground coupler for coupling to the ground rail, a plurality of input terminal couplers for coupling to the plurality of input terminals on the input connecting block, a plurality of output terminal couplers for coupling to the plurality of output terminals on the output connecting block, and surge suppression components electrically coupled to the ground coupler and electrically coupled between corresponding pairs of the plurality of input and output terminal couplers for suppressing electrical surges therebetween.

In a still further aspect of the present invention, a method is provided for suppressing electrical surges in a field termination block assembly. The method comprises the steps of: (a) providing a surge suppression module having surge suppression circuitry disposed within a modular housing, the surge suppression circuitry including a ground coupler for coupling to a ground rail, a plurality of input terminal couplers for coupling to a plurality of input terminals on an input connecting block, a plurality of output terminal couplers for coupling to a plurality of output terminals on an output connecting block, and surge suppression components electrically coupled to the ground coupler; (b) providing a ground rail on the field termination block assembly; and (c) placing the surge suppression module on the field termination block assembly such that the input terminal couplers are coupled to the plurality of input terminals on the input connecting block, the output terminal couplers are coupled to the plurality of output terminals on the output connecting block, and the ground rail coupler is coupled to the ground rail so as to suppress electrical surges between the input terminals and the output terminals.

BRIEF DESCRIPTION OF THE DRAWINGS

The foregoing and other objects, features, and advantages of the invention will become more apparent by reference to the accompanying drawings and the following detailed description taken in conjunction with the drawings in which:

FIG. 6 is an enlarged perspective view showing the internal cavity within the upper housing member shown in FIG. 5;

FIG. 7 is an enlarged perspective view of a lower housing member of the surge suppression module shown in FIG. 3;

FIG. 8 is a top plan view of the lower housing member shown in FIG. 7;

FIG. 16 is a cross-sectional view of the lower housing member taken along lines 16—16 in FIG. 15;

FIG. 17 is a cross-sectional view of the lower housing member taken along lines 17—17 in FIG. 15;

FIG. 18 is a cross-sectional view of the lower housing member taken along lines 18—18 in FIG. 15;

FIG. 19 is a perspective view of a Type 110 field termination block assembly with a ground bar and a plurality of surge suppression modules coupled thereto in accordance with another embodiment of the present invention;

FIG. 20 is an enlarged perspective view of a printed circuit board having surge suppression circuitry and a plurality of test points disposed thereon in accordance with a further embodiment of the present invention;

FIG. 21 is a side elevational view of a ground bar according to one embodiment of the present invention;

FIG. 22 is a side elevational view of the ground rail shown in FIG. 19 having a pair of ground rail mounting lugs coupled thereto for coupling the ground rail to the wiring base as shown in FIG. 1;

FIG. 33 is a side elevational view of a ground rail having a pair of ground rail mounting lugs coupled thereto for coupling the ground rail to the alternate wiring base shown in FIG. 36 in accordance with another embodiment of the present invention;

FIG. 34 is a top elevational view of the ground rail and ground rail mounting lugs shown in FIG. 33;

FIG. 35 is a partial sectional side view illustrating the ground rail mounting lug shown in FIGS. 33 and 34 disposed within a mounting aperture formed in the alternate wiring base shown in FIG. 36;

DETAILED DESCRIPTION OF THE PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
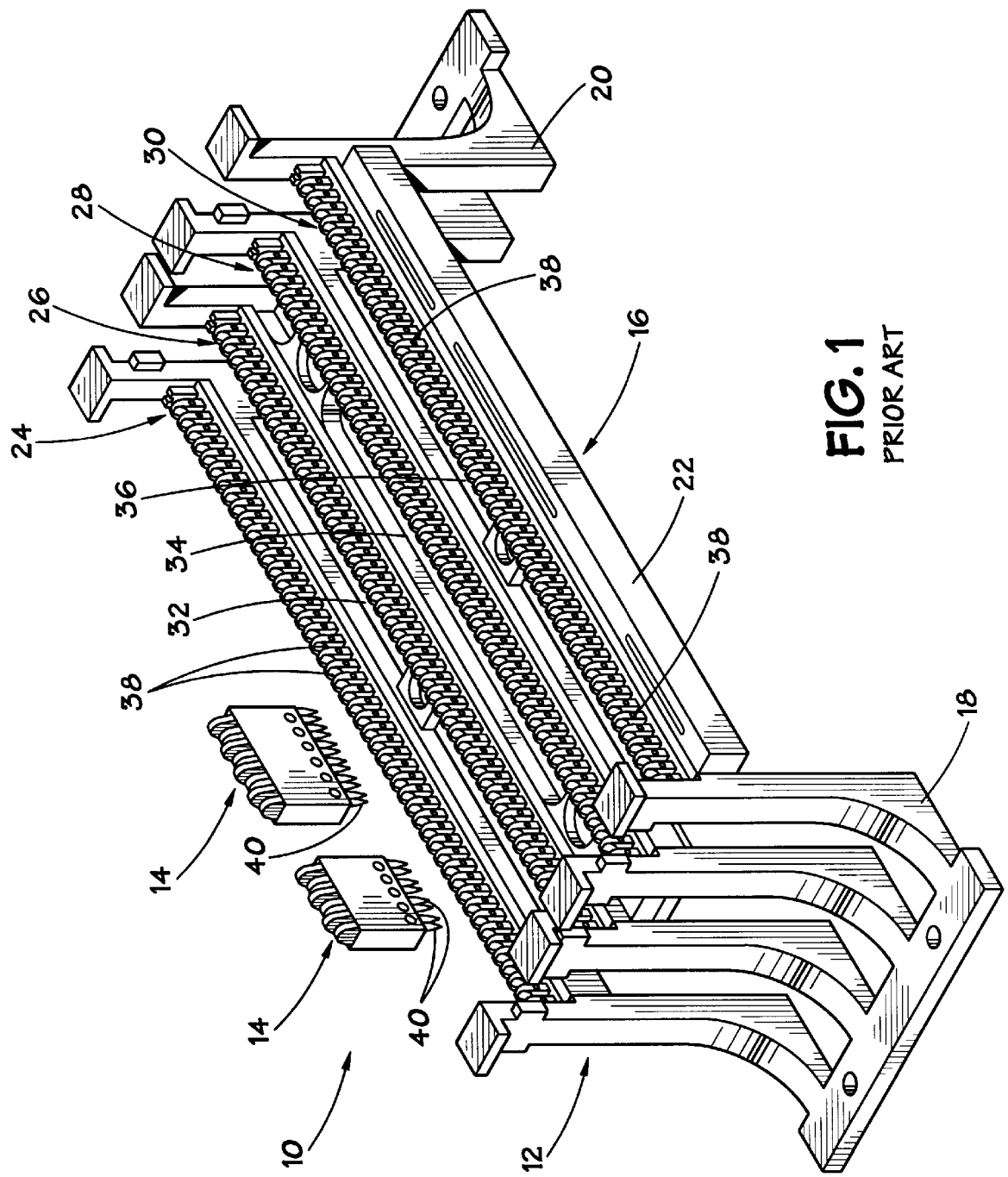
FIG. 1 is a perspective view of a Type 110 field termination block assembly of the prior art for use with the surge suppression system of the present invention.

FIG. 1 is a perspective view of a field termination block assembly shown generally at 10 used in the communication industry for making electrical cross-connections between two sets of conductors. The field termination block assembly 10 is well known in the art as a Type 110 field termination block assembly commercially available from AT&T Technologies, Inc. and described in U.S. Pat. No. 3,798,587, U.S. Pat. No. 4,964,812, and U.S. Pat. No. 5,312,270, the teachings of which are hereby incorporated by reference. As will be explained in greater detail below, the surge suppression system of the present invention may be employed with the field termination block assembly 10, for example, in the telephone industry on distribution panels to safeguard the communications equipment against unusual line characteristics, such as electrical surges resulting in over-voltage or over-current conditions.

The field termination block assembly 10 includes a wiring base 12 and a plurality of connecting blocks 14. The wiring base 12 includes a central area 16 bounded by opposing leg assemblies 18, 20. The central area 16 includes a generally planar base member 22 having a first row of slotted receptacles 24, a second row of slotted receptacles 26, a third row of slotted receptacles 28, and a fourth row of slotted receptacles 30 extending generally perpendicularly therefrom. The rows of slotted receptacles 24–30 are generally parallel to, and spaced a predetermined distance from, one another so as to form a first side channel 32, a middle channel 34, and a second side channel 36 therebetween. Slotted receptacles 38 within each row 24–30 are dimensioned to receive input and/or output cables therein. For purposes of the following discussion, it will be assumed that rows 24 and 26 are matched pairs for receiving corresponding input and output cables, respectively, while rows 28 and 30 are matched pairs for receiving corresponding output and input cables, respectively. Rows 24 and 30 may thus each be referred to as an "input row" of slotted receptacles for receiving cables from the "equipment" or "protected" side of the communications system. Rows 26 and 28 may each be referred to as an "output row" of slotted receptacles for receiving cables from the "field" or "unprotected" side of the communications system.

The connector blocks 14 include a plurality of blade-like terminal clips 40 capable of mating within the slotted receptacles 38 such that, when the connector blocks 14 are snapped into place on the wiring base 12, the terminal clips 40 pierce the insulative coating of the cables disposed within the slotted receptacles 38. In this fashion, the connecting blocks 14 cooperate with the slotted receptacles 38 of the wiring block 12 to simultaneously make electrical interconnections between a multiplicity of conductors within an electrical system without first removing the insulative covering from the conductors. Connecting blocks 14 are shown, by way of example only, in position above the input row 24 for engagement with the slotted receptacles 38 disposed therein. It is to be understood that, in practice, a plurality of connecting blocks 14 will be similarly engaged along the output row 26, the output row 28, and the input row 30 of the wiring base 12. The connecting blocks 14 are well known in the art and may comprise any number of commercially available connecting blocks suitable for use with Type 110 wiring blocks, including but not limited to S110C-5 connecting blocks, S110C-4 connecting blocks, S110C-3 connecting blocks, and S110C-2 connecting blocks available from the Siemon Company of Watertown, Conn.

Figure 2:
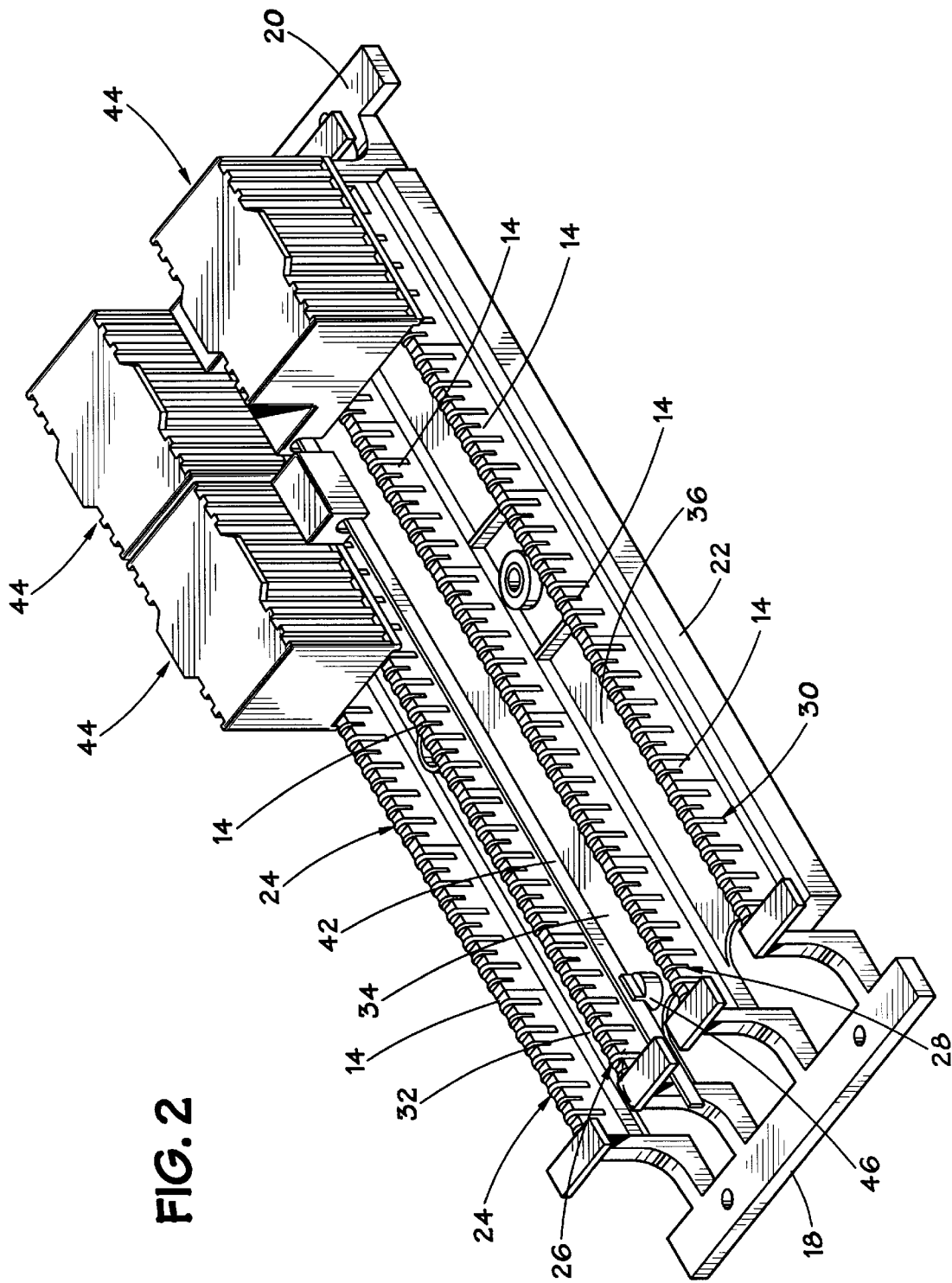
FIG. 2 is a perspective view of a Type 110 field termination block assembly with a ground bar and a plurality of surge suppression modules coupled thereto in accordance with one embodiment of the present invention.

FIG. 2 illustrates the field termination block assembly 10 equipped with a surge suppression system according to one embodiment of the present invention. The surge suppression system of the present invention comprises a ground rail 42 disposed within the central channel 34 and at least one surge suppression module 44 "plugged" onto an adjacent pair of connecting blocks 14 and the ground rail 42. The ground rail 42 preferably comprises an elongated and generally planar conductive bar disposed longitudinally within the central channel 34 such that the generally planar surface is positioned generally perpendicular to the base member 22. The ground rail 42 may be mounted to the base member 22 in any of a variety of manners, including but not limited to mounting lugs 46 disposed at opposing ends of the ground rail 42. As will be explained in greater detail below, each surge suppression module 44 contains circuitry for suppressing unwanted electrical surges that may otherwise pass between corresponding "input" rows and "output" rows of the field termination block assembly 10, thereby protecting the communications equipment from potentially damaging over-voltage and over-current conditions.

Figure 3:
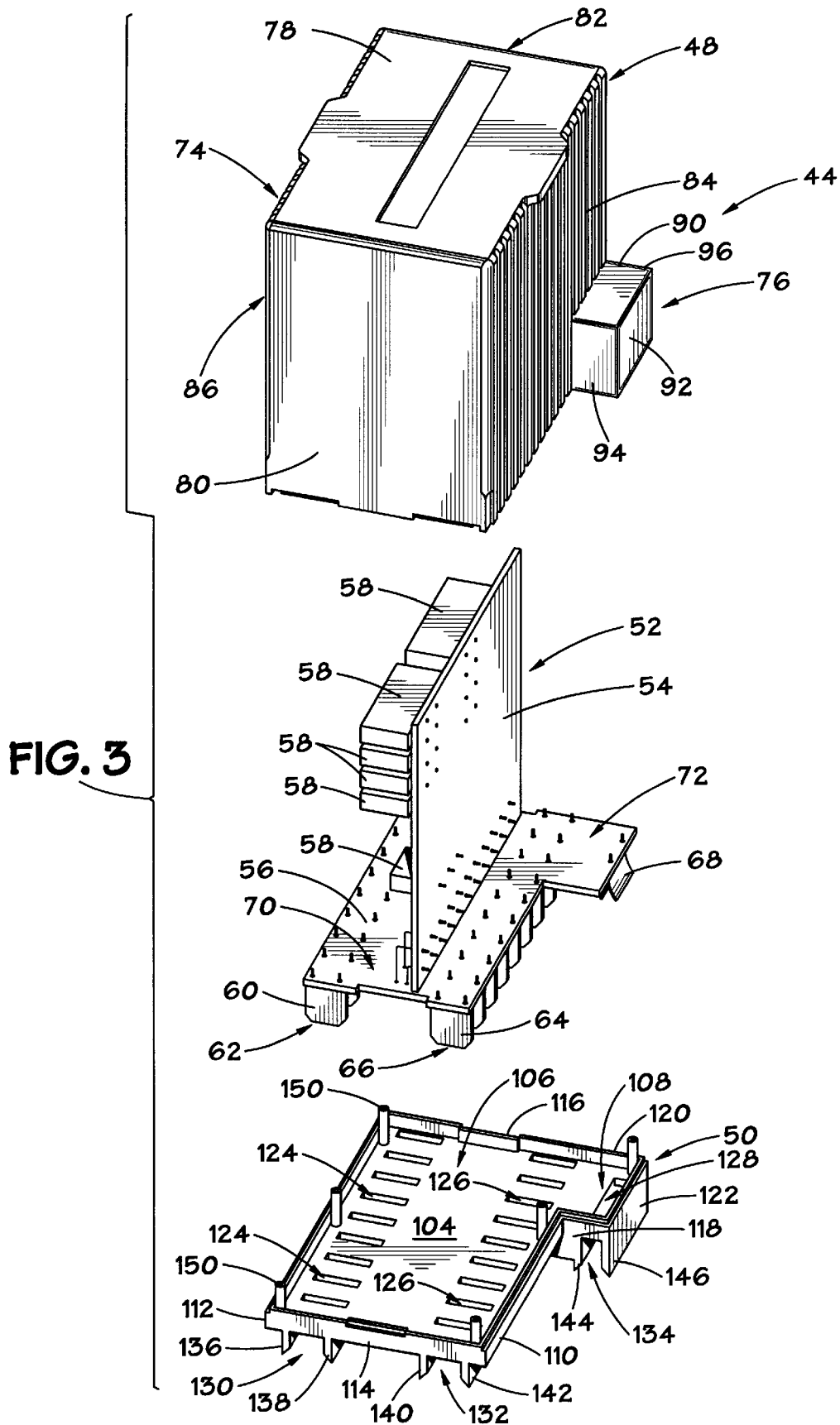
FIG. 3 is an exploded perspective view of a surge suppression module according to one embodiment of the present invention.

FIG. 3 is an exploded perspective view of a surge suppression module 44 according to one embodiment of the present invention. The surge suppression module 44 includes an upper housing member 48, a lower housing member 50, and a circuit board assembly 52. As will be set forth in greater detail below, the upper housing member 48 and lower housing member 50 are dimensioned to collectively retain the circuit board assembly 52 such that the circuit board assembly 52 can be easily and conveniently coupled between an input row of slotted receptacles 24, 30, an output row of slotted receptacles 26, 28, and the ground rail 42 to suppress unwanted electrical surges from the communications equipment coupled to the field termination block assembly 10.

Figure 4:
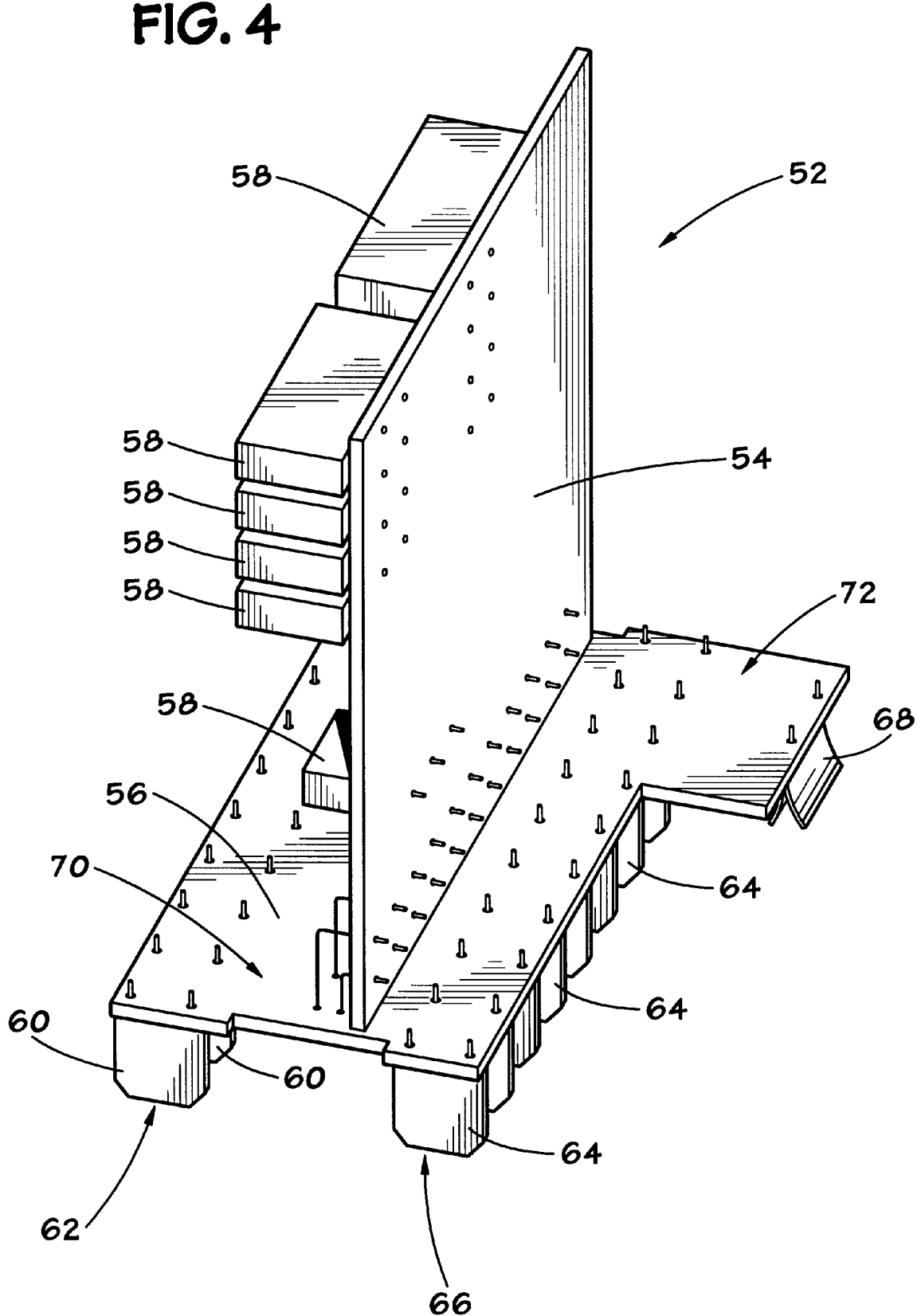
FIG. 4 is an enlarged perspective view of a printed circuit board having surge suppression circuitry disposed thereon in accordance with one embodiment of the present invention.

With reference to FIGS. 3 and 4, the circuit board assembly 52 includes a first printed circuit board 54 mounted generally perpendicularly on a second printed circuit board 56. The first printed circuit board 54 includes a plurality of surge suppression components 58. The second printed circuit board 56 includes a plurality of input couplers 60 (forming an input coupler row designated generally at 62), a plurality of output couplers 64 (forming an output coupler row designated generally at 66), and a ground rail coupler 68. The input couplers 60, output couplers 64, and ground rail coupler 68 are electrically connected to the surge suppression components 58 so as to provide over-voltage and/or over-current surge protection between the input coupler row 62 and the output coupler row 66.

The input couplers 60 and output couplers 64 are preferably blade-like conductive members extending generally perpendicularly downward from a generally rectangular main portion 70 of the second printed circuit board 56. The ground coupler 68 is preferably a clip-type conductive assembly extending generally perpendicularly downward from a generally rectangular secondary portion 72 of the second printed circuit board 56. The input and output couplers 60, 64 are aligned generally perpendicular to the longitudinal axis of the second printed circuit board 56, while the ground coupler 68 is aligned generally parallel to the longitudinal axis of the second printed circuit board 56.

Figure 5:
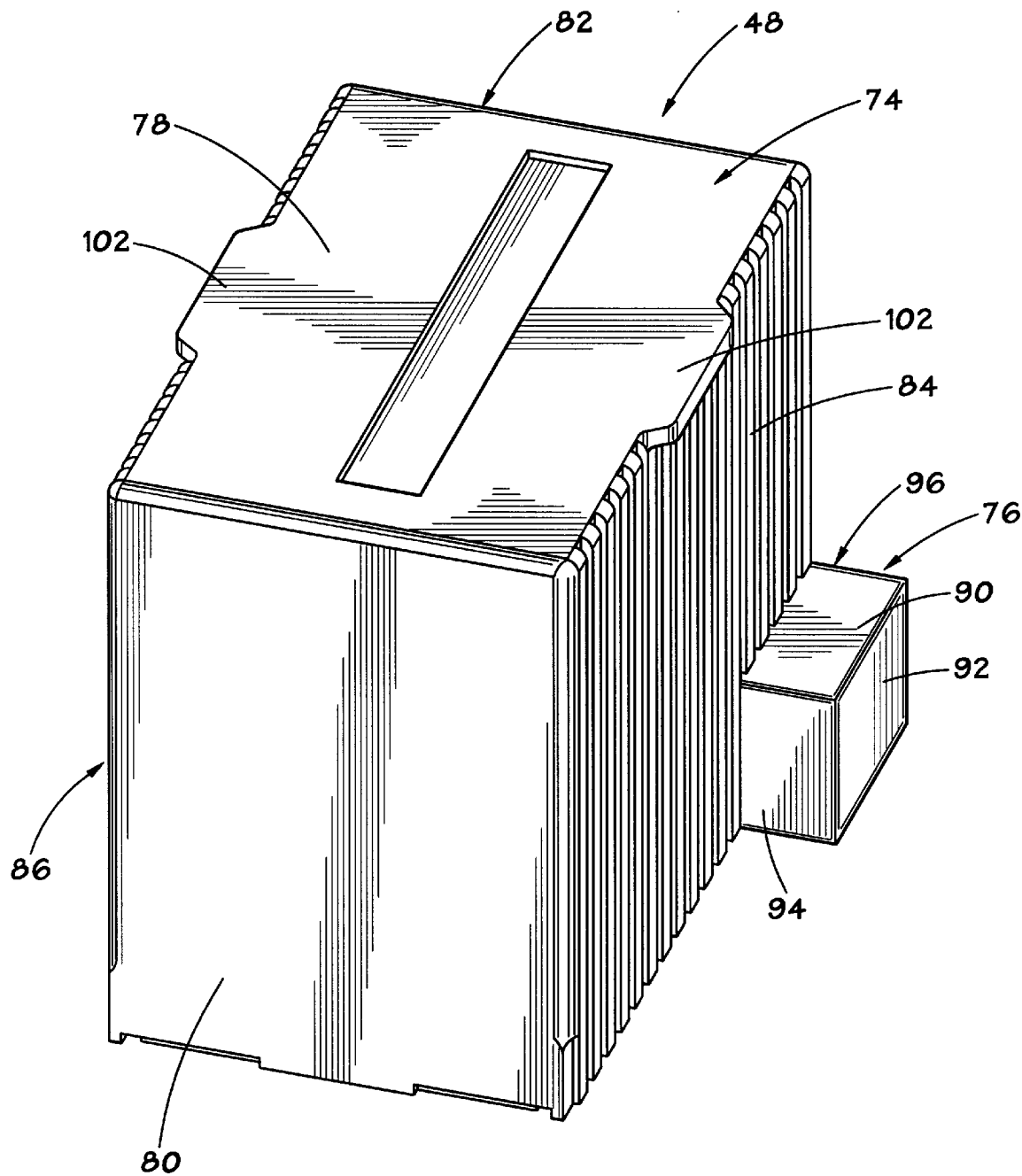
FIG. 5 is an enlarged perspective view of an upper housing member of the surge suppression module shown in FIG. 3.
Figure 9:
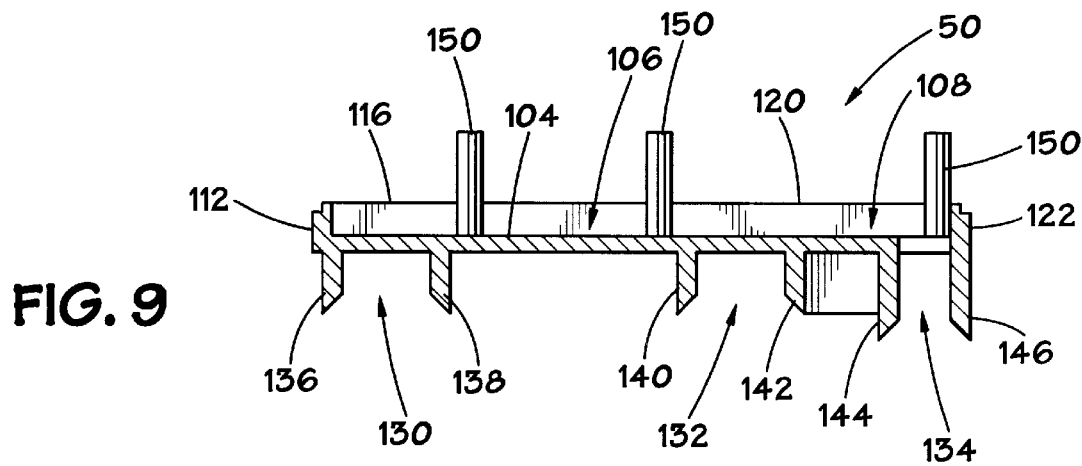
FIG. 9 is a cross-sectional view of the lower housing member taken along lines 9—9 in FIG. 8.
Figure 10:
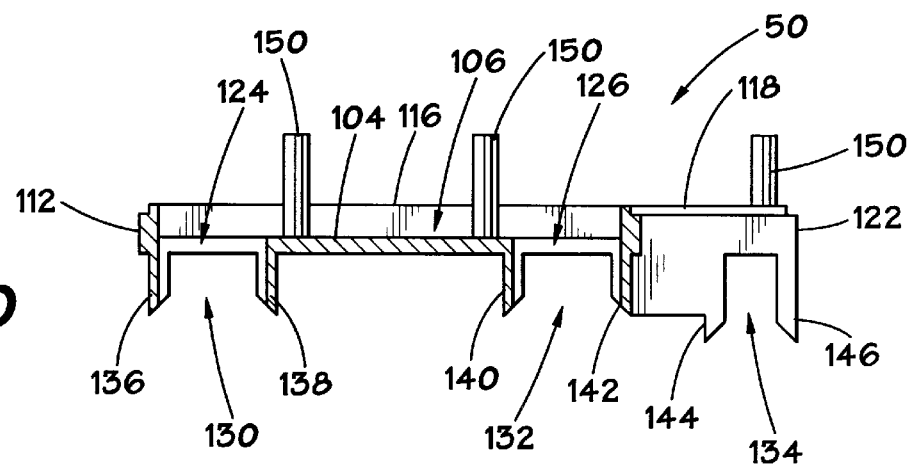
FIG. 10 is a cross-sectional view of the lower housing member taken along lines 10—10 in FIG. 8.
Figure 11:
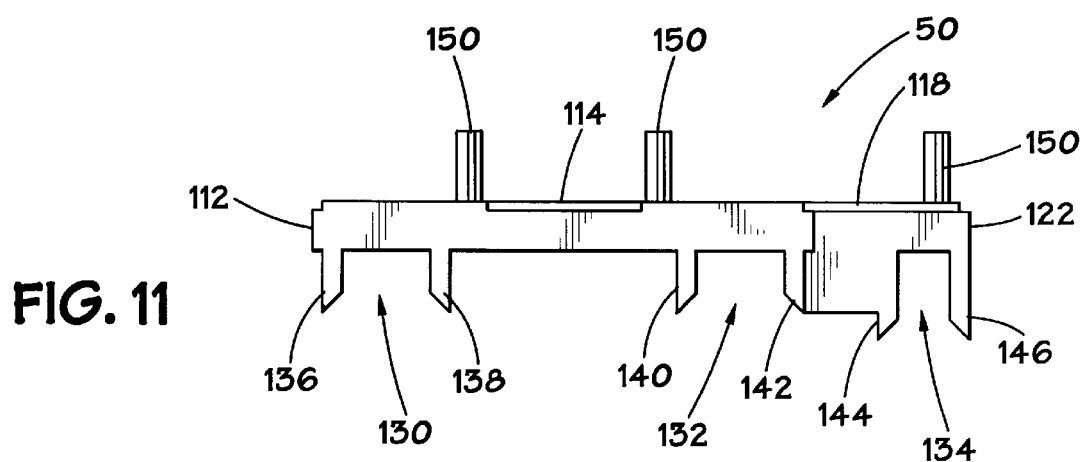
FIG. 11 is a cross-sectional view of the lower housing member taken along lines 11—11 in FIG. 8.
Figure 12:
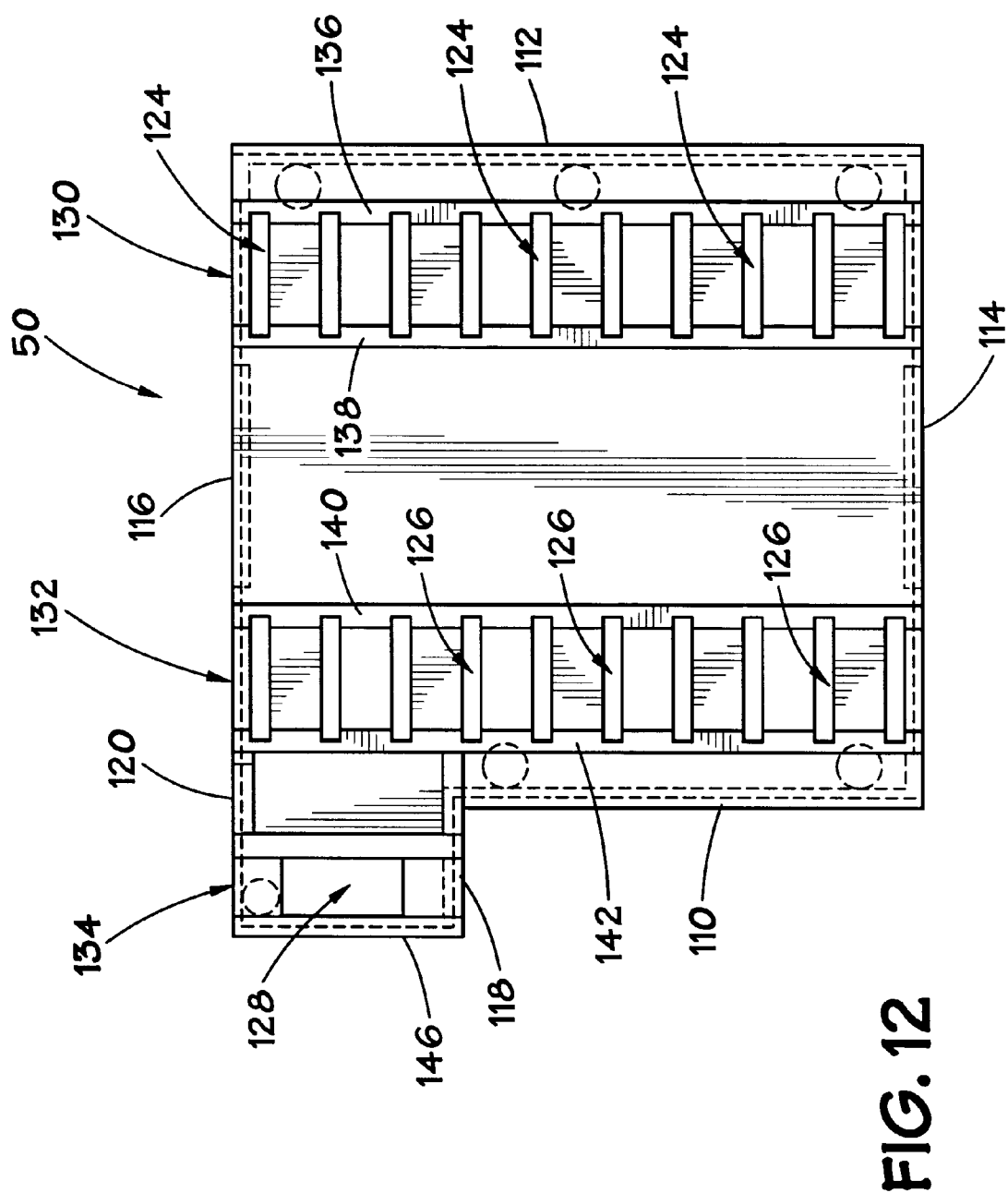
FIG. 12 is a bottom view of the lower housing member shown in FIG. 7.
Figure 13:
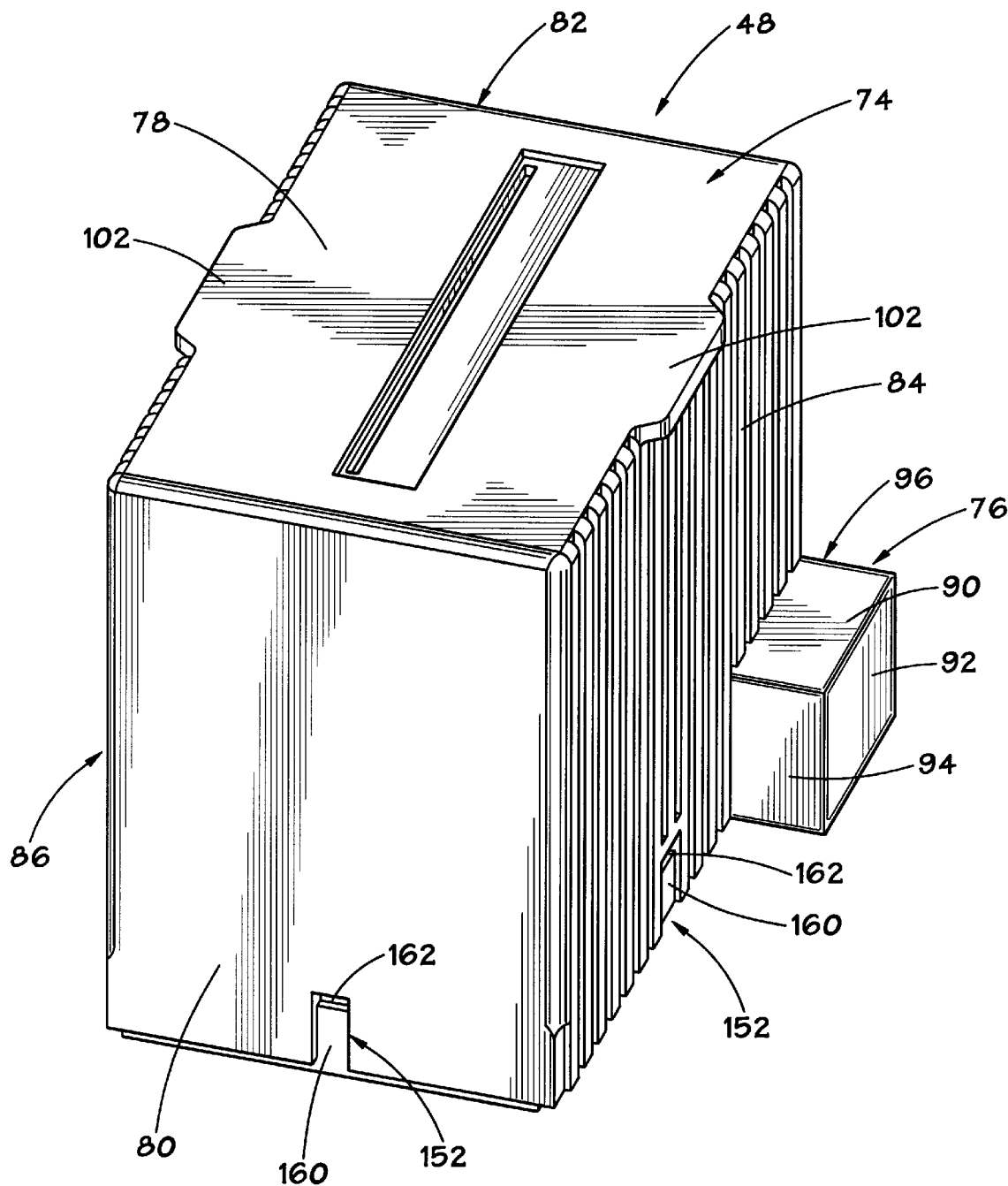
FIG. 13 is an enlarged perspective view of a surge suppression module according to another embodiment of the present invention.
Figure 14:
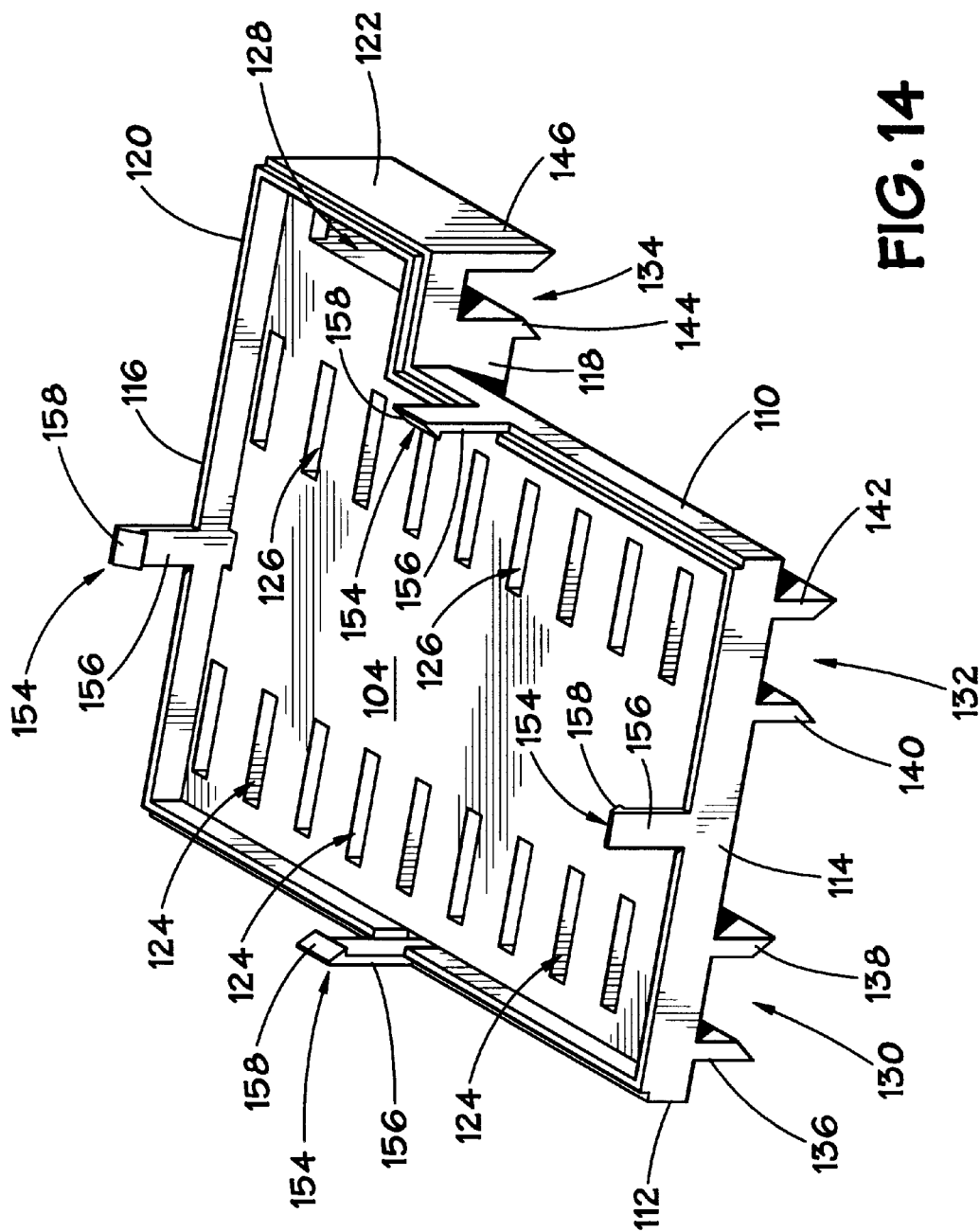
FIG. 14 is an enlarged perspective view of a lower housing member of the surge suppression module shown in FIG. 13.
Figure 15:
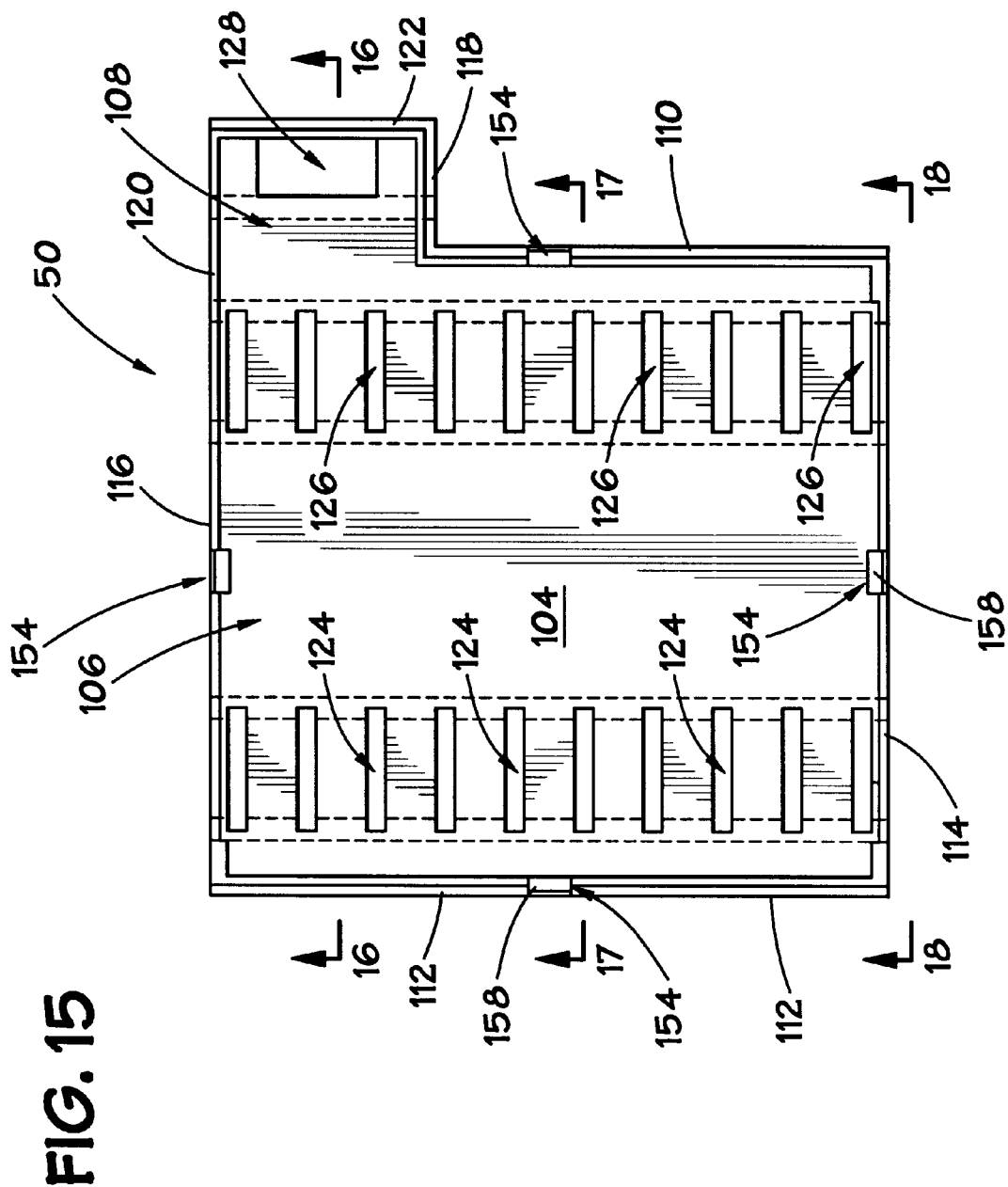
FIG. 15 is a top plan view of the lower housing member shown in FIG. 14.
Figure 23:
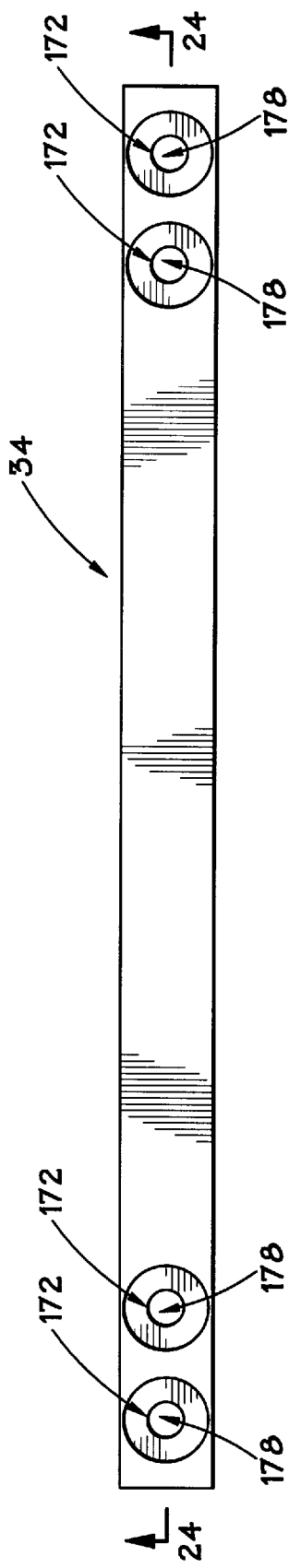
FIG. 23 is a top elevational view of the center channel of the wiring base shown in FIG. 1 having a pair of ground rail mounting apertures formed on either end.
Figure 24:
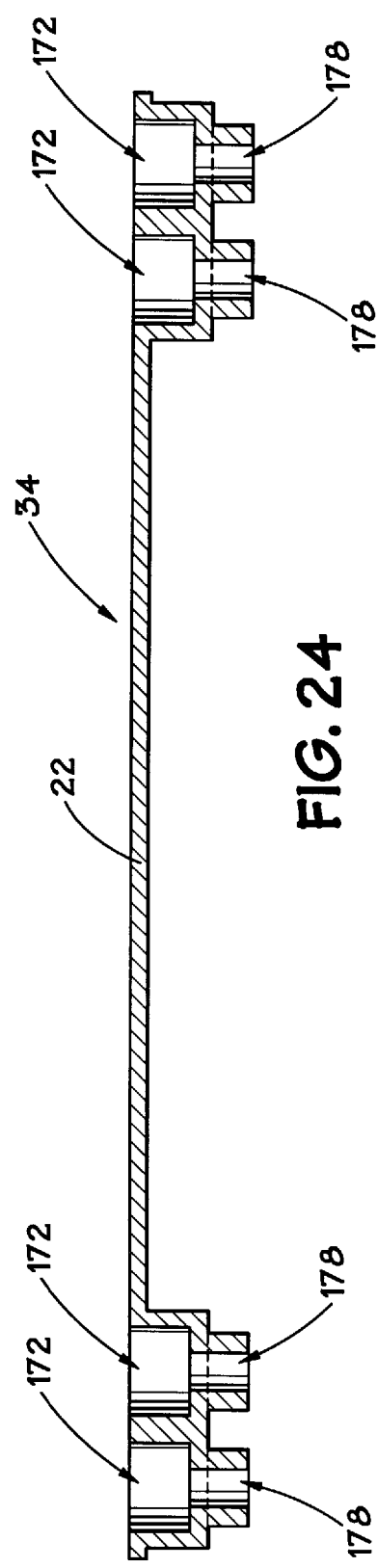
FIG. 24 is a cross-sectional view of the center channel of the wiring base taken along lines 24—24 in FIG. 21.
Figure 25:
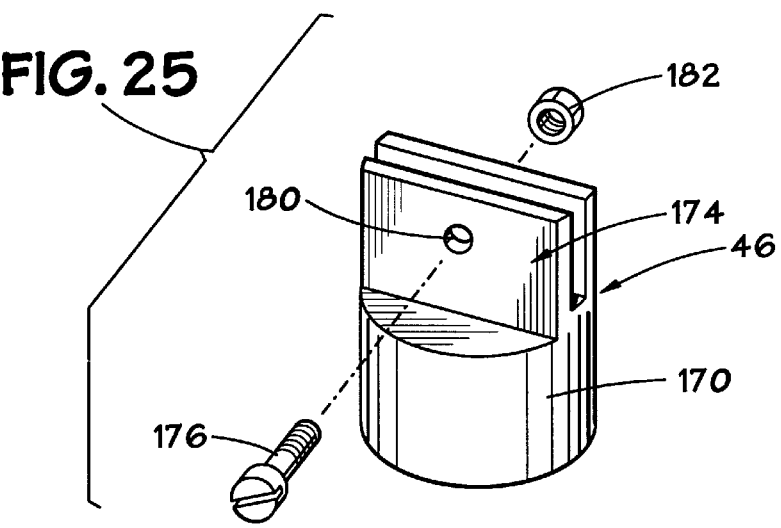
FIG. 25 is a perspective view of a ground rail mounting lug arrangement according to one embodiment of the present invention.
Figure 26:
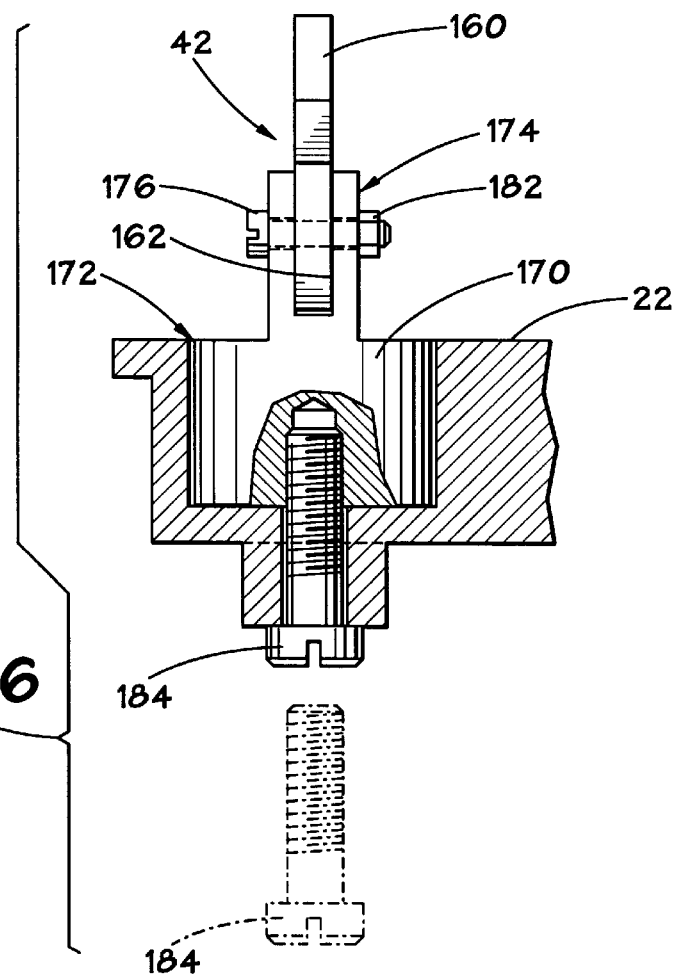
FIG. 26 is a partial sectional view of the ground rail mounting arrangement shown in FIG. 25 coupled to the wiring base and having the ground rail coupled thereto.

Referring to FIGS. 3, 5, and 6, the upper housing member 48 includes a main enclosure 74 and a secondary enclosure 76. The main enclosure 74 is generally rectangular having a top member 78, a first end wall 80, a second end wall 82, a first side wall 84, and a second side wall 86. An internal cavity 88 is formed within the main enclosure 74 dimensioned to receive the first printed circuit board 54 of the circuit board assembly 52. The secondary enclosure 76 is integrally coupled to the main enclosure 74 and includes a top member 90, a side wall 92, a first end wall 94, and a second end wall 96. An internal cavity 98 is formed within the secondary enclosure 76 dimensioned to extend over and enclose the secondary portion 72 of the second printed circuit board 56. A plurality of cylinders 100 having bores formed therein are provided within the internal cavities 88, 98 for coupling the upper housing member 48 to the lower housing member 50. The top member 78 of the main enclosure 74 may also include a pair of lip members 102 extending horizontally therefrom proximate the junction with the first and second side walls 84, 86 for providing purchase during the insertion and removal of the surge suppression module 44.

Referring to FIGS. 3 and 7–12, the lower housing member 50 includes a generally planar base member 104 having a main portion 106 and a secondary portion 108. The main portion 106 of the base member 104 is bounded by a first side wall 110, a second side wall 112, a first end wall 114, and a second end wall 116, all of which are integrally coupled to the base member 104 and extend generally perpendicularly upward therefrom. The secondary portion 108 of the base member 104 is similarly bounded by a first end wall 118, a second end wall 120, and a side wall 122, all of which are integrally coupled to the base member 104 and extend generally perpendicularly upward therefrom. The main portion 106 of the base member 104 includes a plurality of apertures 124 for receiving the input couplers 60 of the circuit board assembly 52, and a plurality of apertures 126 for receiving the output couplers 64 of the circuit board assembly 52. The secondary portion 108 of the base member 104 includes an aperture 128 for receiving the ground coupler 68 of the circuit board assembly 52. A plurality of cylinders 150 having bores formed therein are provided along the periphery of the main portion 106 and secondary portion 108 of the base member 104 for coupling the upper housing member 48 to the lower housing member 50.

Extending from the bottom side of the base member 104 are an input coupler skirt 130, an output coupler skirt 132, and a ground coupler skirt 134 provided to protect the input couplers 60, output couplers 64, and ground coupler 68, respectively, when the circuit board assembly 52 is positioned within the upper and lower housing members 48, 50. The input coupler skirt 130 includes a first skirt member 136 and a second skirt member 138 extending longitudinally and generally perpendicular to the base member 104 on either side of the apertures 124. The output coupler skirt 132 includes a first skirt member 140 and a second skirt member 142 extending longitudinally and generally perpendicular to the base member 104 on either side of the apertures 126. The ground coupler skirt 134 similarly includes a first skirt member 144 and a second skirt member 146 extending longitudinally and generally perpendicular to the base member on either side of the aperture 128. As will be readily appreciated, the input coupler skirt 130, output coupler skirt 132, and ground coupler skirt 134 effectively envelop the input couplers 60, output couplers 64, and ground coupler 68, respectively, so as to protect these couplers when the surge suppression module 44 is engaged with the field termination block assembly 10.

It is to be readily understood that the upper and lower housing members 48, 50 in FIGS. 3 and 5–12 are provided by way of example and not limitation and that the construction of the upper and lower housing members 48, 50 may vary without departing from the scope of the present invention. For example, referring to FIGS. 13–18, the upper and lower housing members 48, 50 may be equipped with an alternate coupling mechanism. In this exemplary embodiment, the upper housing member 48 is provided with a plurality of engagement grooves 152 and the lower housing member 50 is provided with a plurality of engagement members 154. Each engagement member 154 includes a main body portion 156 and a lip member 158. Each engagement groove 152 includes a slot 160 and a notch 162 dimensioned to receive the main body portion 156 and lip member 158, respectively, of a corresponding engagement member 154. This coupling mechanism provides easy of assembly by allowing a user to simply place the circuit board assembly 52 in position on the lower housing assembly 50 and "snap" the upper housing member 48 into engagement with lower housing member 50 to thereby enclose the circuit board assembly 52 therein.

Turning to FIGS. 19 and 20, the surge suppression module 44 of the present invention may also be equipped with a plurality of test points 196 to facilitate troubleshooting the surge suppression electronics on the circuit board assembly 52 without removing the surge suppression module 44 from the field termination block assembly 10 and without disengaging the upper and lower housing members 48, 50. While the test points 196 are shown extending from the top of the first printed circuit board 54 (and hence through the top surface of the upper housing member 48), it is to be readily understood that the test points 196 may be located in any number of different areas about the surge suppression module 44. For example, the test points 196 may be physically located within the surge suppression module 44 and accessed via access apertures formed in the upper and/or lower housing members 48, 50.

FIG. 21 illustrates the ground rail 42 according to one embodiment of the surge suppression system of the present invention. The ground rail 42 is elongated and generally planar in construction with an engagement portion 160 extending along the upper periphery, mounting lug coupling portions 162 extending downward from the engagement portion 160 at opposing ends thereof, and ground lug coupling portions 164 extending laterally away from opposing ends of the engagement portion 160. The engagement portion 160 is dimensioned to receive the ground coupler 68 of the surge suppression module 44 of the present invention for grounding the surge suppression circuitry disposed on the circuit board assembly 52. With combined reference to FIGS. 21 and 22, the mounting lug coupling portions 162 include apertures 166 for coupling mounting lugs 46 thereto.

Turning to FIGS. 22–26, the mounting lugs 46 include a base portion 170 dimensioned to be received within mounting apertures 172 formed in the middle channel 34 of the wiring base 12 shown in FIGS. 1 and 2. In the embodiment shown, the base portion 170 of each mounting lug 46 is provided with an internally disposed hole dimensioned to threadably receive a bolt or screw member 184 passing through a lower aperture 178 to thereby affix the mounting lug 46 within the mounting apertures 172 (see FIG. 26). The mounting lugs 46 also include a slotted engagement portion 174 extending upwardly from the base portion 170 for receiving the mounting lug coupling portions 162 of the ground rail 42. The slotted engagement portion 174 is provided with apertures 180 suitably dimensioned to receive a bolt or screw member 176 which passes through the aperture 166 and onto a threaded nut 182 to affix the mounting lug 168 to the ground rail 42. The ground lug coupling portions 164 of the ground rail 42 are generally planar and extend generally horizontally from either end of the engagement portion 160. The ground lug coupling portions 164 may include an aperture (not shown) suitable for being coupled to a grounding lug 176 which is, in turn, connected to system ground.

Figure 27:
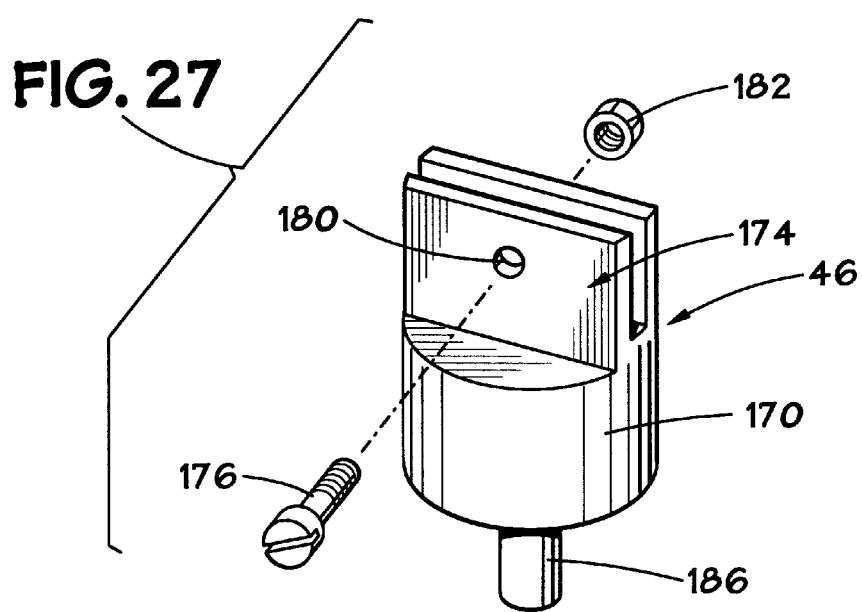
FIG. 27 is a perspective view of a ground rail mounting lug arrangement according to another embodiment of the present invention.
Figure 28:
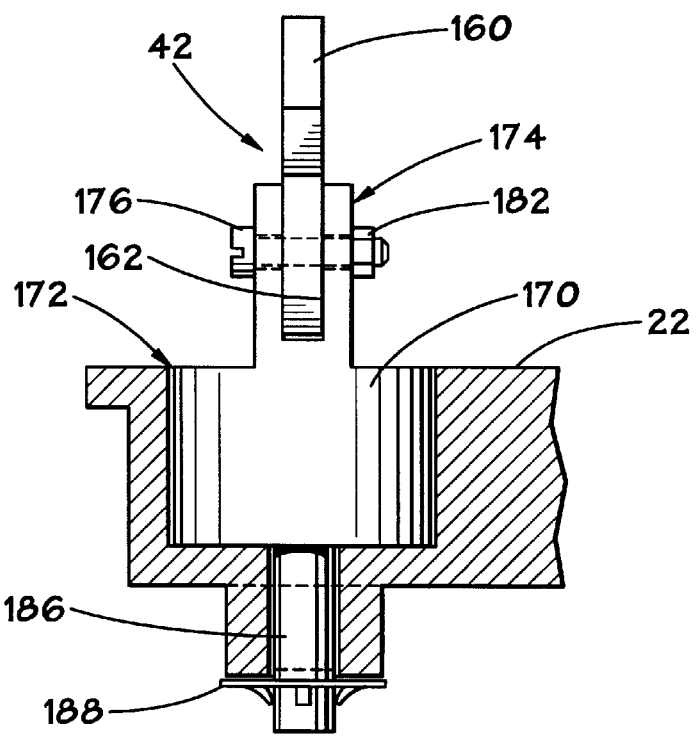
FIG. 28 is a partial sectional view of the ground rail mounting arrangement shown in FIG. 27 coupled to the wiring base and having the grounding rail coupled thereto.
Figure 29:
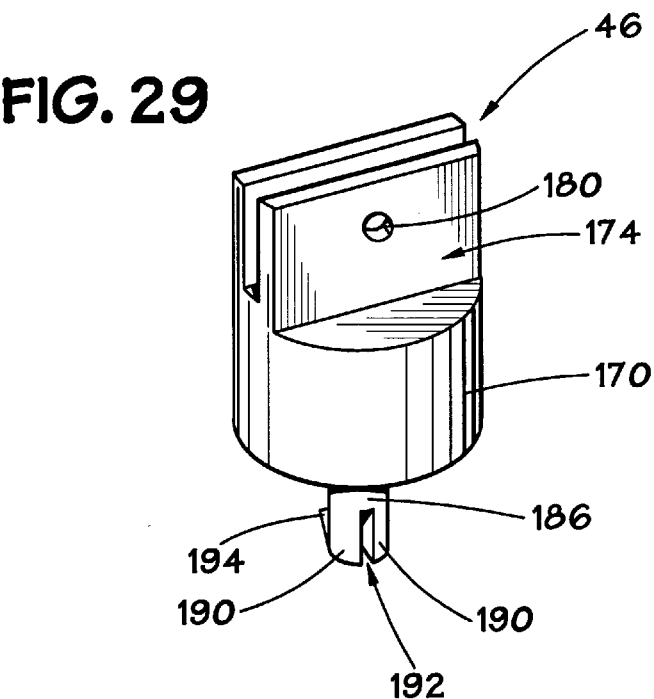
FIG. 29 is a perspective view of a ground rail mounting arrangement according to a further embodiment of the present invention.
Figure 30:
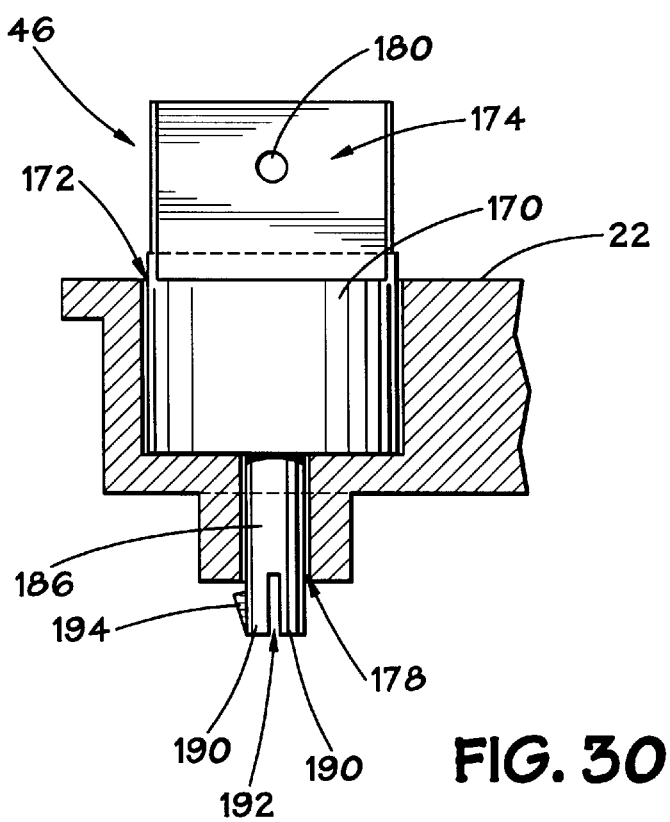
FIG. 30 is a partial sectional view of the ground rail mounting arrangement shown in FIG. 29 coupled to the wiring base and having the grounding rail coupled thereto.
Figure 31:
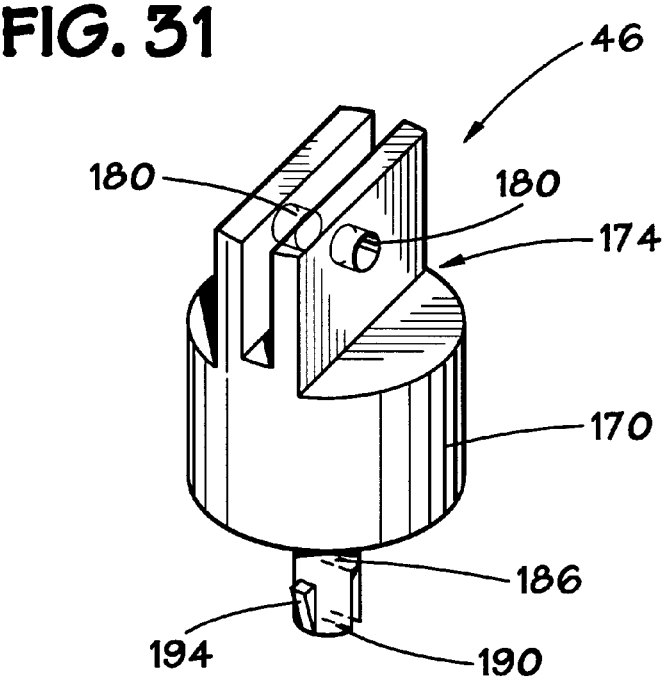
FIG. 31 is another perspective view of the ground rail mounting arrangement shown in FIG. 29.
Figure 32:
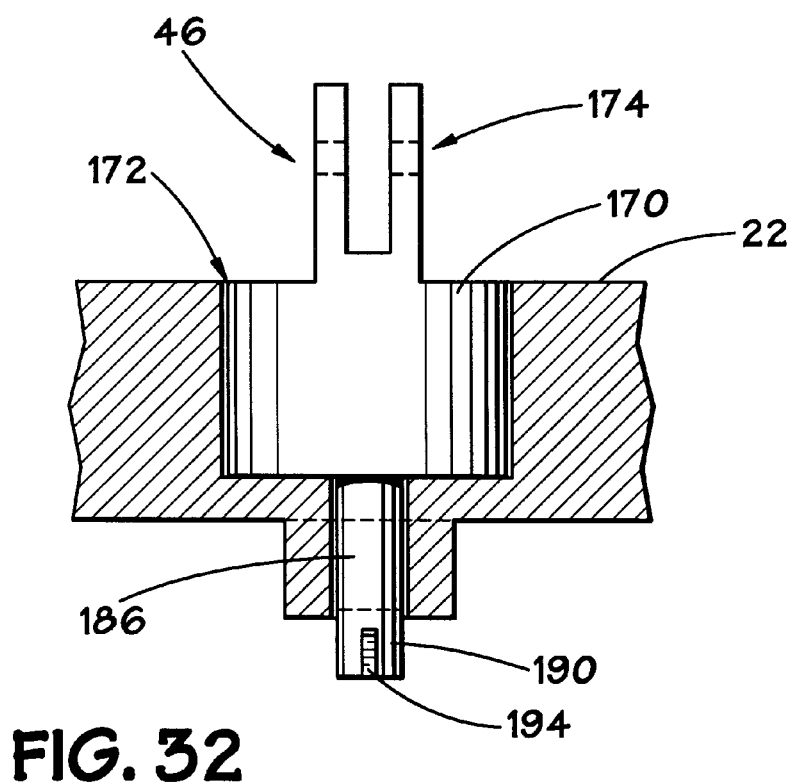
FIG. 32 is another partial sectional view of the ground rail mounting arrangement shown in FIG. 29.

The mounting lugs 46 provided above are set forth by way of example only and various modifications and alternate embodiments can be made without departing from the scope of the present invention. For example, as shown in FIGS. 27 and 28, the mounting lugs 46 may include a post member 186 extending downward from the base portion 170, wherein the post member 186 is dimensioned to be received within the lower aperture 178 disposed beneath the mounting aperture 172 of the wiring base 12. As will be appreciated by those skilled in the art, the post member 186 can be fixed within the lower aperture 178 by engaging a spring washer 188 thereto.

FIGS. 29–32 illustrate a still further embodiment of the mounting lug 46 suitable for mounting the ground rail 42 to the wiring base 12 in accordance with the present invention. The post member 186 includes a pair of finger members 190 spaced a predetermined distance from one another forming a compression slot 192 therebetween. An angled seating latch 194 is provided on one of the finger members 190 such that, when the post member 186 is being inserted into the lower aperture 178, the seating latch 194 forces the finger members 190 towards one another, closing the compression slot 192, thereby allowing the base portion 170 of the mounting lug 46 to be positioned within the mounting aperture 172. The finger members 190 are resilient such that they expand apart from each other once the seating latch 194 exits through the bottom of the lower aperture 178. The seating latch 194, being angled, thereafter will extend past the periphery of the lower aperture 178 to thereby secure the mounting lug 46 position within the middle channel 34 of the wiring base 12. The mounting lugs 46 can be constructed from any of a variety of materials, including but not limited to nylon and various other plastics.

Figure 36:
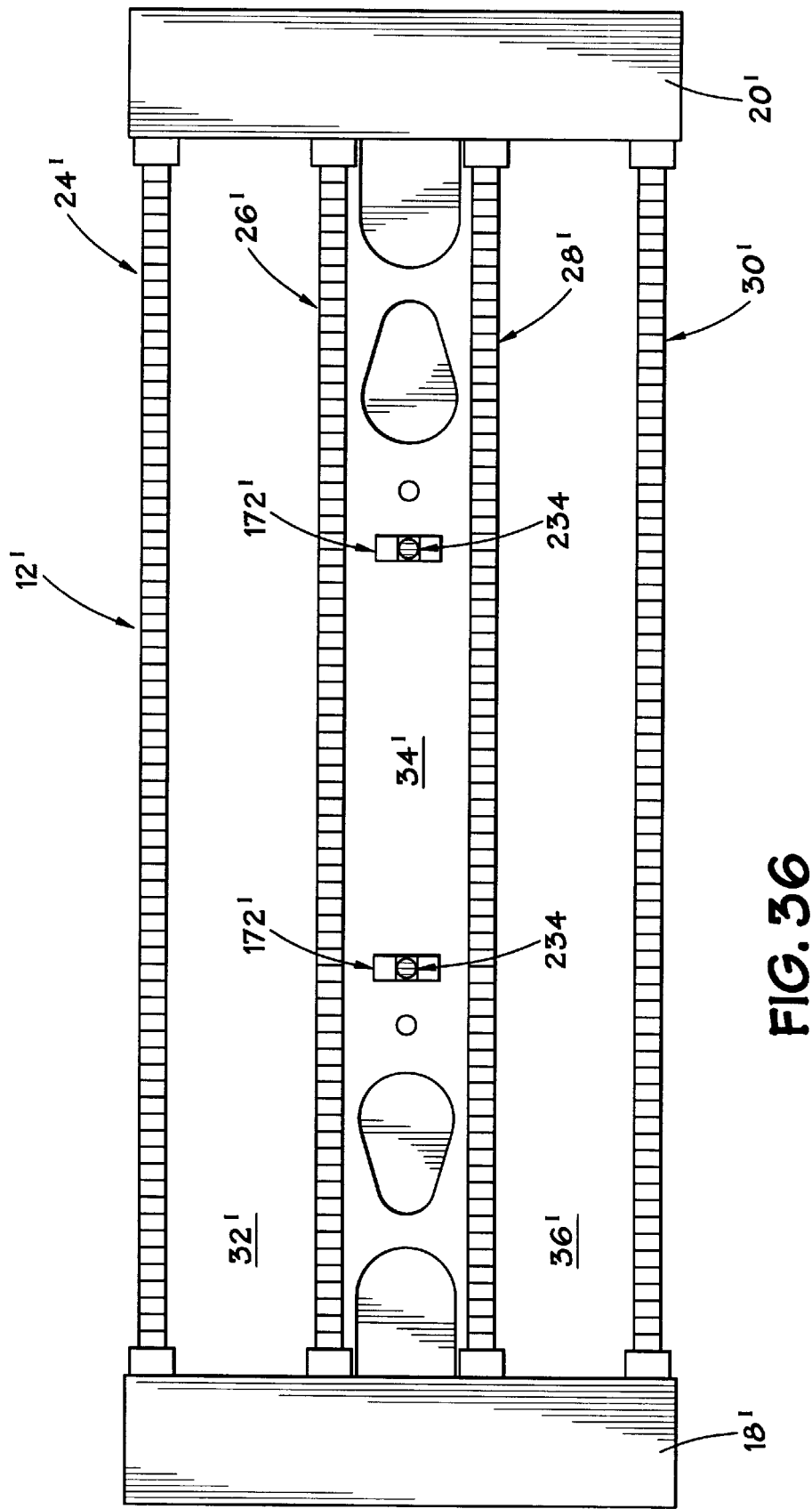
FIG. 36 is a top elevational view illustrating an alternate wiring base capable of being used with the surge suppression system of the present invention.

FIGS. 33–35 illustrate a ground rail/mounting lug arrangement suitable for use with the wiring block 12' shown in FIG. 36, which is commercially available from ICC of Cerritos, Calif. The construction of the ICC wiring block 12' is substantially identical to that of the AT&T wiring block 12 described above with reference to FIGS. 1 and 2. The main distinction is that the middle channel 34' of the ICC wiring block 12' include mounting apertures 172' of substantially different construction than the mounting apertures 172 of the AT&T wiring block 12. In particular, the mounting apertures 172' are generally rectangular in shape and each include a horizontally extending cross-bar 234 which bisects the mounting aperture 172' parallel to the rows of slotted receptacles 24'–30'. In all other respects, the construction of the ICC wiring block 12' is the same as the AT&T wiring block 12 such that the remaining elements need not be described.

As shown in FIGS. 33 and 34, the ground rail 42' is substantially identical to the ground rail 42 described with reference to FIGS. 21 and 22. The main distinction is that each mounting lug coupling portion 162' is relatively narrow and includes a lower lip portion 236 extending generally horizontally with an aperture 166' for coupling the mounting lugs 46' thereto. The mounting lugs 46' are substantially identical to the mounting lugs 46 described above such that the distinctions need only be addressed. The base portion 170' of each mounting lug 46' includes a threaded bore (shown in phantom) for receiving a threaded bolt or screw 176' therein. As best seen in FIG. 34, the screw 176' extends through the aperture 166' within the lower lip portion 236 to thereby secure the ground rail 42' to the mounting lugs 46'.

Referring to FIGS. 33 and 35, the mounting lugs 46' include a first post member 186a and a second post member 186b extending in spaced relation from the bottom surface of the base portion 170'. The first and second post members 186a, 186b are each constructed with a pair of finger members 190' spaced a predetermined distance from one another so as to form a compression slot 192' therebetween. An angled seating latch 194' is provided on one of the fingers 190' of each post member 186a, 186b. When the post members 186a, 186b are inserted into the mounting apertures 172', the seating latches 194' force the finger members 190' of each post member 186a, 186b toward one another, thereby closing each compression slot 192' such that the post members 186a, 186b can "snap" in place about the cross-bar 236 to affix the mounting lug 46' to the wiring base 12'. It is to be readily understood that the foregoing ground rail/mounting lug arrangement is set forth by way of example only and that any number of modifications can be made without departing from the scope of the present invention.

The surge suppression circuitry on the circuit board assembly 52 may be tailored to suit any of a variety of surge suppression applications. For example, referring to FIG. 37, a surge suppression circuit 200 is shown for protecting four pair of high speed data transmission lines. The surge suppression circuit 200 includes a bank of steering diodes 202 and a silicon avalanche diode 204 electrically coupled to the input couplers 60, the output couplers 64, and the ground coupler 68 of the circuit board assembly 52. As will be appreciated by those skilled in the art, the bank of steering diodes 202 offer low capacitance and advantageously simplifies the circuit such that only one silicon avalanche diode 204 is required. The silicon avalanche diode 204 is a voltage clamping device, well known in the art, which can be set at various voltages depending upon the application to provide over-voltage surge suppression.

Figure 37:
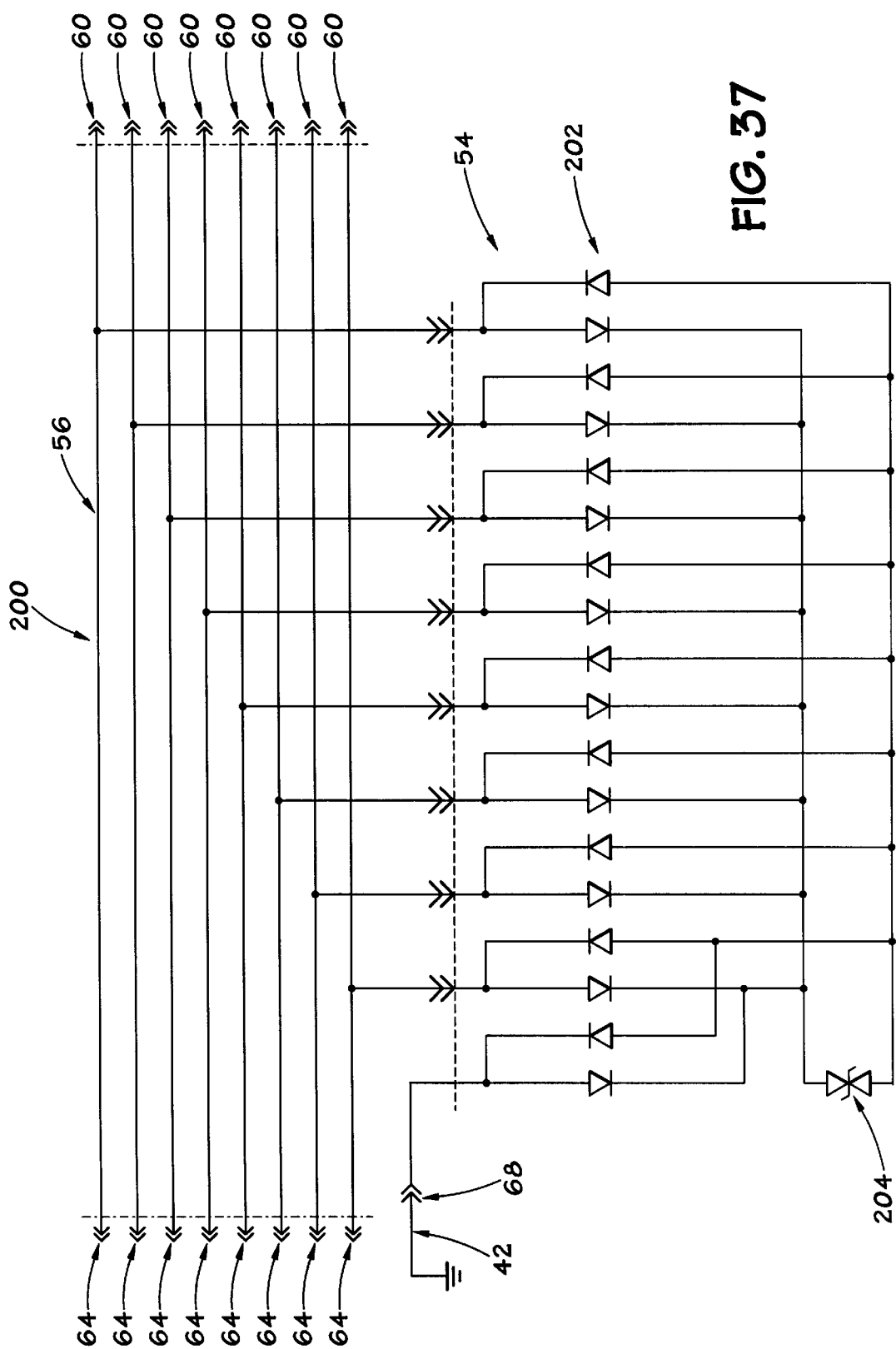
FIG. 37 is a schematic illustrating the surge suppression circuitry disposed on the printed circuit board according to one embodiment of the present invention.
Figure 38:
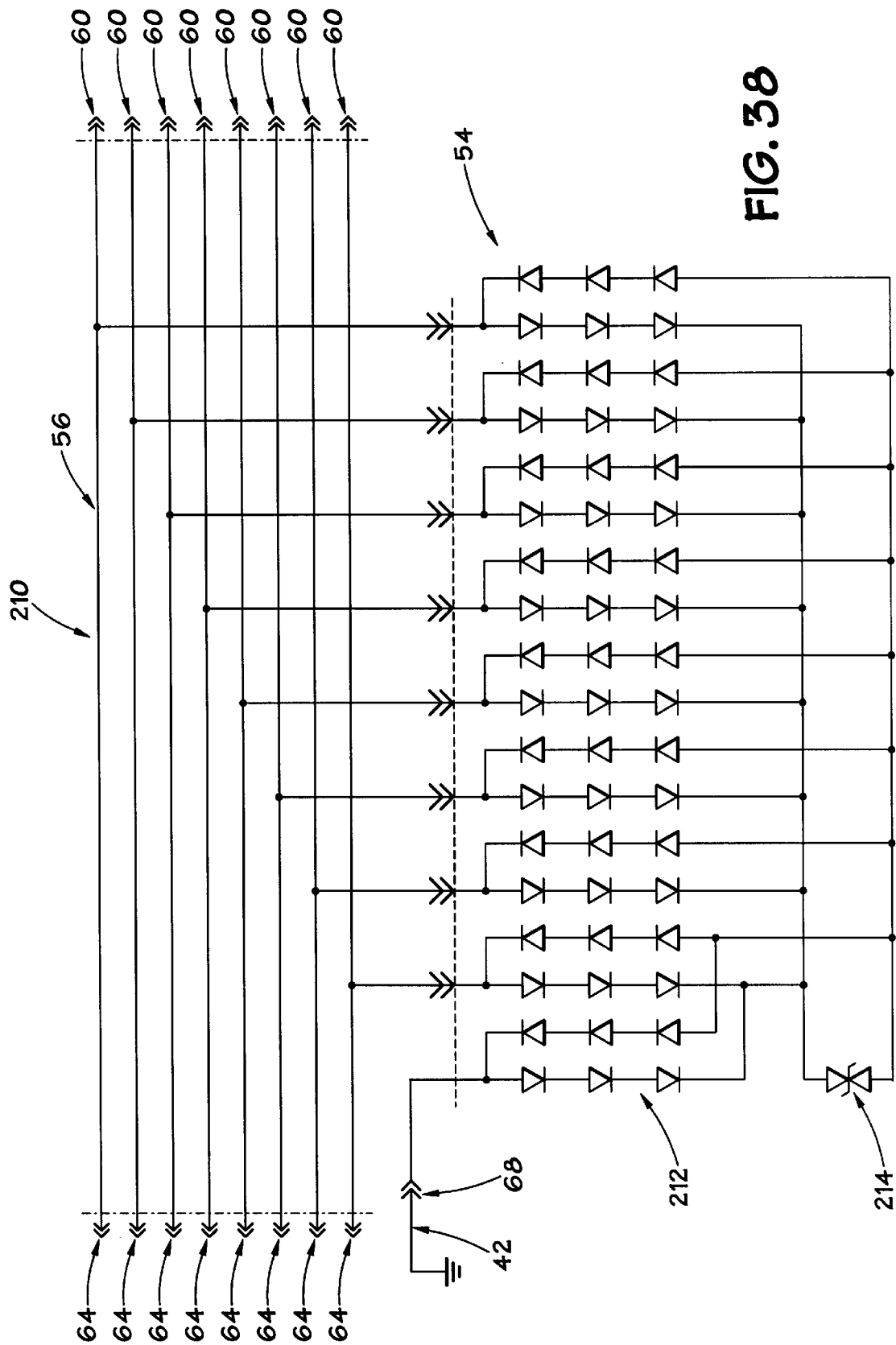
FIG. 38 is a schematic illustrating the surge suppression circuitry disposed on the printed circuit board according to a further embodiment of the present invention.

Referring to FIG. 38, a surge suppression circuit 210 may be provided for protecting against unusual line characteristics in a four pair CAT 5a/5b system. In this embodiment, the surge suppression circuit 210 includes an array of steering diodes 212 and a silicon avalanche diode 214 electrically coupled to the input couplers 60, the output couplers 64, and the ground coupler 68 of the circuit board assembly 52. The array of steering diodes 212 advantageously provides extremely low capacitance and, as with the embodiment shown in FIG. 37, serves to simplify the circuit such that only one silicon avalanche diode 214 is required. The silicon avalanche diode 214 operates in the same manner as the avalanche silicon diode 204, providing over-voltage suppression between the input couplers 60 and output couplers 62.

Figure 39:
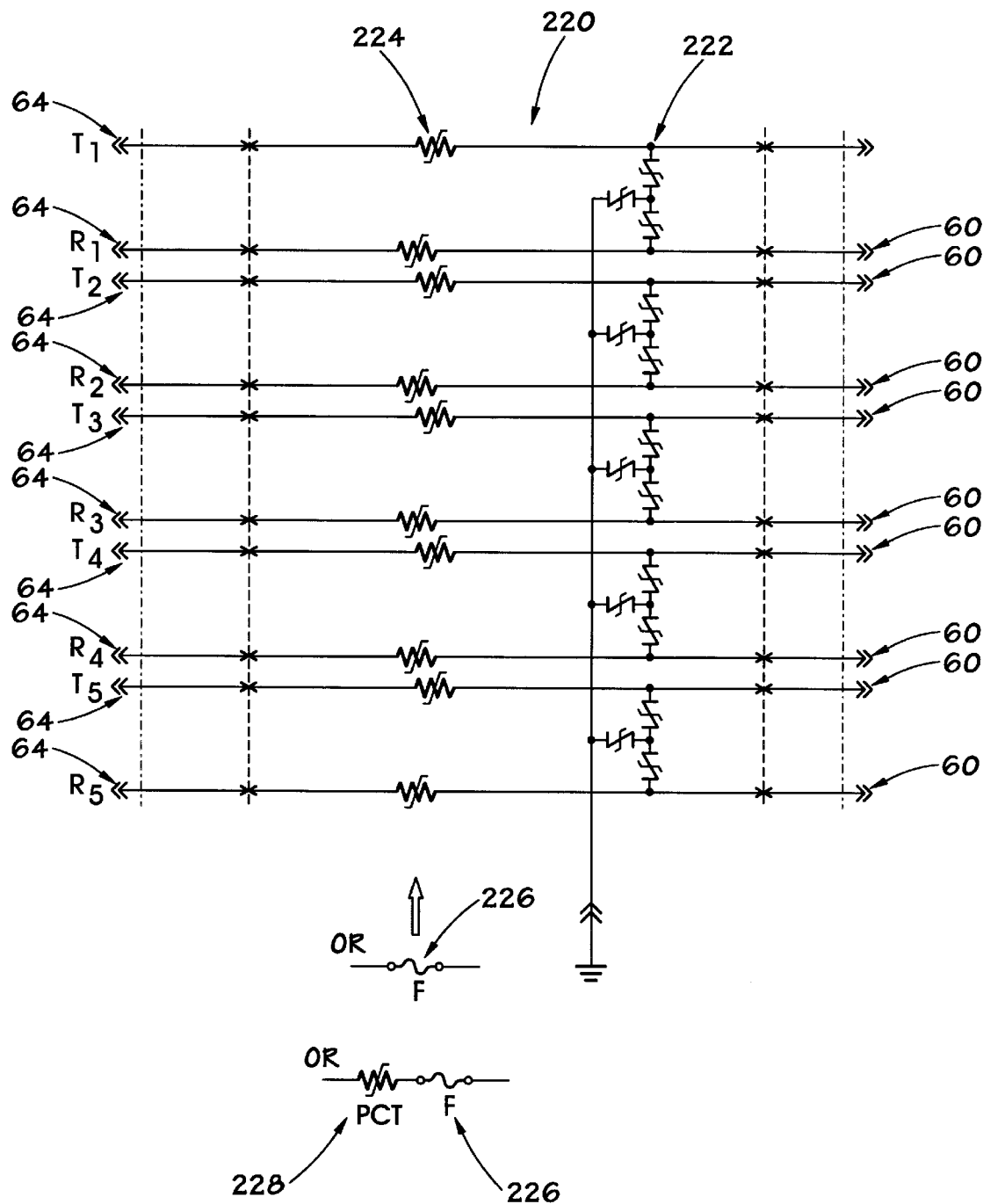
FIG. 39 is a schematic illustrating the surge suppression circuitry disposed on the printed circuit board according to still further embodiment of the present invention.

FIG. 39 illustrates yet another exemplary surge suppression circuit 220 for a five pair telephone communications system. The surge suppression circuit 220 includes a plurality of sidactor silicon avalanche diodes 222 and a plurality of positive temperature coefficient devices 224 electrically coupled to the input couplers 60, the output couplers 62, and the ground coupler 68. The sidactor silicon avalanche diodes 222 are well known in the art and provide over-voltage surge protection. The positive temperature coefficient devices 224 are also well known in the art and provide over-current surge protection. As shown below the circuit 220, the positive temperature coefficient devices 224 may be substituted with a fuse 226 or a fuse 226 in series with a positive temperature coefficient device 228 to accomplish the same desired surge suppression.

In each embodiment demonstrated in FIGS. 37–39, the circuit arrangement serves to protect the equipment from unwanted surges that may otherwise pass between the "input" or "protected" side of the field termination block assembly 10 and the "output" or "unprotected" side of the field termination block assembly 10. The present invention therefore advantageously overcomes the drawbacks in the prior art.

While the principles of the invention have now been made clear in illustrative embodiments, it will become obvious to those skilled in the art many modifications and structure, arrangement, components, and materials used the practice of the invention and otherwise which are particularly adapted for specific operating requirements without departing from those principles. The appended claims are therefore intended to cover and embrace any such modifications.

What is claimed is:

1. A surge suppression system for electrical interconnection with a field termination block assembly having a wiring base with at least one input row of slotted receptacles for receiving input cables and at least one output row of slotted receptacles for receiving output cables, said field termination block assembly including at least one input connecting block having a plurality of input terminals for electrical connection with said input cables and at least one output connecting block having a plurality of output terminals for electrical connection with said output cables, said surge suppression system comprising:

a ground rail defining a generally planar surface coupled to said wiring base of said field termination block assembly proximate one of said at least one input row and said at least one output row such that said planar surface is oriented generally perpendicular to said wiring base; and a surge suppression module having surge suppression circuitry disposed within a modular housing, said surge suppression circuitry including a ground coupler defining a pair of opposed conductive members situatable on either side of said planar surface for coupling to said ground rail, a plurality of input terminal couplers for coupling to said plurality of input terminals on said terminal connecting block, a plurality of output terminal couplers for coupling to said plurality of output terminals on said terminal connecting block, and surge suppression components electrically coupled to said ground coupler and electrically coupled between corresponding pairs of said plurality of input and output terminal couplers for suppressing electrical surges therebetween.

2. The surge suppression system set forth in claim 1 and further:

said surge suppression circuitry including a printed circuit board having said surge suppression components disposed thereon, said ground rail coupler coupled thereto, and said plurality of input and output terminal couplers coupled thereto; and said modular housing including a plurality of apertures formed along a first side thereof for allowing said plurality of input and output terminal couplers to couple with said plurality of input and output terminals when said surge suppression module is positioned on said terminal connecting block.

3. The surge suppression system set forth in claim 2 and further:

said plurality of input and output terminal couplers extending from a first side of said printed circuit board so as to extend through said plurality of apertures along said first side of said modular housing, said plurality of input and output terminal couplers thereby engaging with said plurality of input and output terminals when said surge suppression module is positioned on said terminal connecting block.

4. The surge suppression system set forth in claim 1 and further, comprising:

at least one ground rail mounter for releasably mounting said ground rail to said terminal connecting block, said ground rail mounter having a receiving area for receiving a portion of said ground rail.

5. The surge suppression system set forth in claim 4 and further:

said ground rail mounter including a base capable of being received within a mounting socket formed in said terminal connecting block.

6. The surge suppression system set forth in claim 1 and further:

each of said at least one input rows and a corresponding one of said at least output rows forming pairs of matched input and output receptacles;

each of said input rows and said corresponding output rows defining a channel therebetween;

each of said pairs of matched input and output rows defining a central channel therebetween; and said ground rail being disposed longitudinally within said central channel.

7. The surge suppression system set forth in claim 6 and further:

said at least one input row comprising at least first and second input rows;

said at least one output row comprising at least first and second output rows; and said first and second output rows defining said central channel.

8. The surge suppression module set forth in claim 3 and further:

said input and output couplers being aligned generally perpendicular to said longitudinal axis; and said ground coupler being aligned generally parallel to said longitudinal axis.

9. A surge suppression system for electrical interconnection with a field termination block assembly having a wiring base with at least one input row of slotted receptacles for receiving input cables and at least one output row of slotted receptacles for receiving output cables, said field termination block assembly including at least one input connecting block having a plurality of input terminals for electrical connection with said input cables and at least one output connecting block having a plurality of output terminals for electrical connection with said output cables, said surge suppression system comprising:

a ground rail coupled to said wiring base of said field termination block assembly proximate one of said at least one input row and said at least one output row;

a surge suppression module having surge suppression circuitry disposed within modular housing, said surge suppression circuitry including a ground coupler for coupling to said round rail, a plurality of input terminal couplers for coupling to said plurality of input terminals on said terminal connecting block, a plurality of output terminal couplers for coupling to said plurality of output terminals on said terminal connecting block, and surge suppression components electrically coupled to said ground coupler and electrically coupled between corresponding pairs of said plurality of input and out terminal couplers for suppression electrical surges therebetween;

said modular housing including a first protective skirt extending past said plurality of input terminal couplers for protecting said input terminal couplers when engaged with said predetermined number of input terminals on said terminal connecting block; and said modular housing including a second protective skirt extending past said plurality of output terminal couplers for protecting said output terminal couplers when engaged with said predetermined number of output terminals on said terminal connecting block.

10. The surge suppression system set forth in claim 9 and further:

said modular housing including a ground coupler aperture for allowing said ground coupler to couple with said ground rail when said surge suppression module is positioned on said terminal connecting block.

11. The surge suppression system set forth in claim 10 and further:

said ground coupler extending from said first side of said printed circuit board so as to couple with said ground rail when said surge suppression module is positioned on said terminal connecting block.

12. The surge suppression system set forth in claim 11 and further:

said modular housing including a third protective skirt extending past said ground coupler for protecting said ground coupler when engaged with said ground rail.

13. The surge suppression system set forth in claim 12 and further:

said first protective skirt and said plurality of input terminal couplers being disposed proximate a first edge of said first side of said suppression module; and said second protective skirt and said plurality of output terminal couplers being disposed proximate a second edge of said first side of said suppression module.

14. The surge suppression system set forth in claim 13 and further:

said ground rail being disposed proximate, and generally parallel to, said plurality of output terminals on said terminal connecting block; and said third protective skirt and said ground coupler being disposed proximate, and generally parallel to, said second protective skirt and said plurality of output terminal couplers.

15. An improved field termination block assembly, comprising:

(a) a wiring base with at least one input row of slotted receptacles for receiving input cables and at least one output row of slotted receptacles for receiving output cables;

(b) at least one input connecting block having a plurality of input terminals for electrical connection with said input cables;

(c) at least one output connecting block having a plurality of output terminals for electrical connection with said output cables;

(d) a ground rail defining a generally planar surface coupled to said wiring base proximate one of said at least one input row and said at least one output row such that said planar surface is oriented generally perpendicular to said wiring base;

(e) a surge suppression module having surge suppression circuitry disposed within a modular housing, said surge suppression circuitry including a ground coupler defining a pair of opposed conductive members situatable on either side of said planar surface for coupling to said ground rail, a plurality of input terminal couplers for coupling to said plurality of input terminals on said terminal connecting block, a plurality of output terminal couplers for coupling to said plurality of output terminals on said terminal connecting block, and surge suppression components electrically coupled to said ground coupler and electrically coupled between corresponding pairs of said plurality of input and output terminal couplers for suppressing electrical surges therebetween.

16. The improved field termination block assembly set forth in claim 15 and further:

said surge suppression circuitry including a printed circuit board having said surge suppression components disposed thereon, said ground rail coupler coupled thereto, and said plurality of input and output terminal couplers coupled thereto; and said modular housing including a plurality of apertures formed along a first side thereof for allowing said plurality of input and output terminal couplers to couple with said plurality of input and output terminals when said surge suppression module is positioned on said terminal connecting block.

17. The improved field termination block assembly set forth in claim 16 and further:

said plurality of input and output terminal couplers extending from a first side of said printed circuit board so as to extend through said plurality of apertures along said first side of said modular housing, said plurality of input and output terminal couplers thereby engaging with said plurality of input and output terminals when said surge suppression module is positioned on said terminal connecting block.

18. The improved field termination block assembly set forth in claim 17 and further:

said modular housing including a first protective skirt extending past said plurality of input terminal couplers for protecting said input terminal couplers when engaged with said predetermined number of input terminals on said terminal connecting block; and said modular housing including a second protective skirt extending past said plurality of output terminal couplers for protecting said output terminal couplers when engaged with said predetermined number of output terminals on said terminal connecting block.

19. The improved field termination block assembly set forth in claim 18 and further:

said modular housing including a ground coupler aperture for allowing said ground coupler to couple with said ground rail when said surge suppression module is positioned on said terminal connecting block.

20. The improved field termination block assembly set forth in claim 19 and further:

said ground coupler extending from said first side of said printed circuit board so as to couple with said ground rail when said surge suppression module is positioned on said terminal connecting block.

21. The improved field termination block assembly set forth in claim 20 and further:

said modular housing including a third protective skirt extending past said ground coupler for protecting said ground coupler when engaged with said ground rail.

22. The improved field termination block assembly set forth in claim 21 and further:

said first protective skirt and said plurality of input terminal couplers being disposed proximate a first edge of said first side of said suppression module; and said second protective skirt and said plurality of output terminal couplers being disposed proximate a second edge of said first side of said suppression module.

23. The improved field termination block assembly set forth in claim 22 and further:

said ground rail being disposed proximate, and generally parallel to, said plurality of output terminals on said terminal connecting block; and said third protective skirt and said ground coupler being disposed proximate, and generally parallel to, said second protective skirt and said plurality of output terminal couplers.

24. The improved field termination block assembly set forth in claim 15 and further, comprising:

at least one ground rail mounter for releasably mounting said ground rail to said terminal connecting block, said ground rail mounter having a receiving area for receiving a portion of said ground rail.

25. The improved field termination block assembly set forth in claim 24 and further:

said ground rail mounter including a base capable of being received within a mounting socket formed in said terminal connecting block.

26. A surge suppression module comprising:

a first printed circuit board including a plurality of surge suppression components;

a second printed circuit board defining first and second sides, said first printed circuit board being mounted generally perpendicularly on said first side;

a plurality of input couplers extending from said second side so as to form an input coupler row;

a plurality of output couplers extending from said second side so as to form an output coupler row; and a ground coupler extending from said second side.

27. The surge suppression module set forth in claim 26 and further:

said second printed circuit board being generally L-shaped, such that said second printed circuit board includes a first portion defining a longitudinal axis and a second portion extending from the first portion generally perpendicular to the longitudinal axis;

said input and output coupler rows extending from the first portion, said rows extending generally parallel to said longitudinal axis; and said ground coupler extending from said second portion.

* * * * *